(12) United States Patent
Tiwari et al.

(10) Patent No.: US 8,694,903 B2
(45) Date of Patent: Apr. 8, 2014

(54) METHODS AND SYSTEMS FOR MANAGING AN E-READER INTERFACE

(75) Inventors: Soumya Tiwari, Chattisgarh (IN);
Ruchir Rodrigues, Dallas, TX (US);
John F. Gallagher, Hopewell, NJ (US);
Raju T. Ramakrishnan, Bangalore (IN);
Ashish Phutela, Haryana (IN); Peter Joseph, Kerala (IN); Manisha Gupta, Uttar Pradesh (IN); Manidipa Bhattacharyya, Assam (IN); James Y. Hwang, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 300 days.

(21) Appl. No.: 13/041,223

(22) Filed: Mar. 4, 2011

(65) Prior Publication Data
US 2012/0227002 A1 Sep. 6, 2012

(51) Int. Cl.
*G06F 3/048* (2013.01)

(52) U.S. Cl.
USPC .......................................................... 715/765

(58) Field of Classification Search
USPC .................................. 715/764, 722
See application file for complete search history.

(56) References Cited

U.S. PATENT DOCUMENTS

| | | | |
|---|---|---|---|
| 6,489,974 B1 * | 12/2002 | Johnson et al. ................ | 715/772 |
| 2008/0122796 A1 * | 5/2008 | Jobs et al. ...................... | 345/173 |
| 2010/0179991 A1 * | 7/2010 | Lorch et al. ................... | 709/206 |
| 2011/0191692 A1 * | 8/2011 | Walsh et al. ................... | 715/752 |
| 2011/0250819 A1 * | 10/2011 | Tashman .......................... | 446/46 |
| 2011/0283238 A1 * | 11/2011 | Weising ......................... | 715/852 |
| 2012/0066581 A1 * | 3/2012 | Spalink .......................... | 715/232 |
| 2012/0192118 A1 * | 7/2012 | Migos et al. ................... | 715/863 |
| 2012/0204086 A1 * | 8/2012 | Stoner et al. ................... | 715/201 |
| 2012/0311438 A1 * | 12/2012 | Cranfill et al. ................. | 715/256 |

* cited by examiner

*Primary Examiner* — William Bashore
*Assistant Examiner* — Rayeez Chowdhury

(57) ABSTRACT

Exemplary methods and systems for managing an e-reader interface are disclosed herein. An exemplary method includes an e-reader interface management system directing an e-reader device to display a plurality of graphical objects representative of a plurality of segments of an e-publication, detecting a user interaction with a graphical object within the plurality of graphical objects and representative of a segment within the plurality of segments, and directing the e-reader device to remove at least one other graphical object within the graphical objects from the display of the graphical objects, wherein the at least one other graphical object is representative of at least one other segment within the plurality of segments that is unrelated to the segment. Corresponding methods and systems are also disclosed.

25 Claims, 19 Drawing Sheets

METHODS AND SYSTEMS FOR MANAGING AN E-READER INTERFACE

BACKGROUND INFORMATION

The advent of e-publications and e-reader devices has allowed for the convenient distribution and access of literature in electronic format. For example, publishers are able to disseminate e-publications without the overhead costs typically associated with producing and distributing printed publications. Similarly, users are able to conveniently store, access, and/or transport vast libraries of publications by way of a single e-reader device that can fit in the user's bag or pocket.

In some instances, e-reader devices present one or more user interfaces to facilitate a user's access to and/or experience of one or more e-publications. Unfortunately, however, traditional e-reader interfaces can be rigid and unintuitive as well as lack options for customization or personalization. For example, many traditional e-reader interfaces have a grid-like format that limits what is displayed, how it is displayed, where it is displayed, and how e-publication content is discovered, navigated, and accessed by a user. As a result, the process of browsing traditional e-reader interfaces and accessing corresponding e-publication content may seem constricted, unintuitive, and otherwise unappealing for users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers may designate identical or similar elements.

DETAILED DESCRIPTION OF PREFERRED EMBODIMENTS

Figure 1:
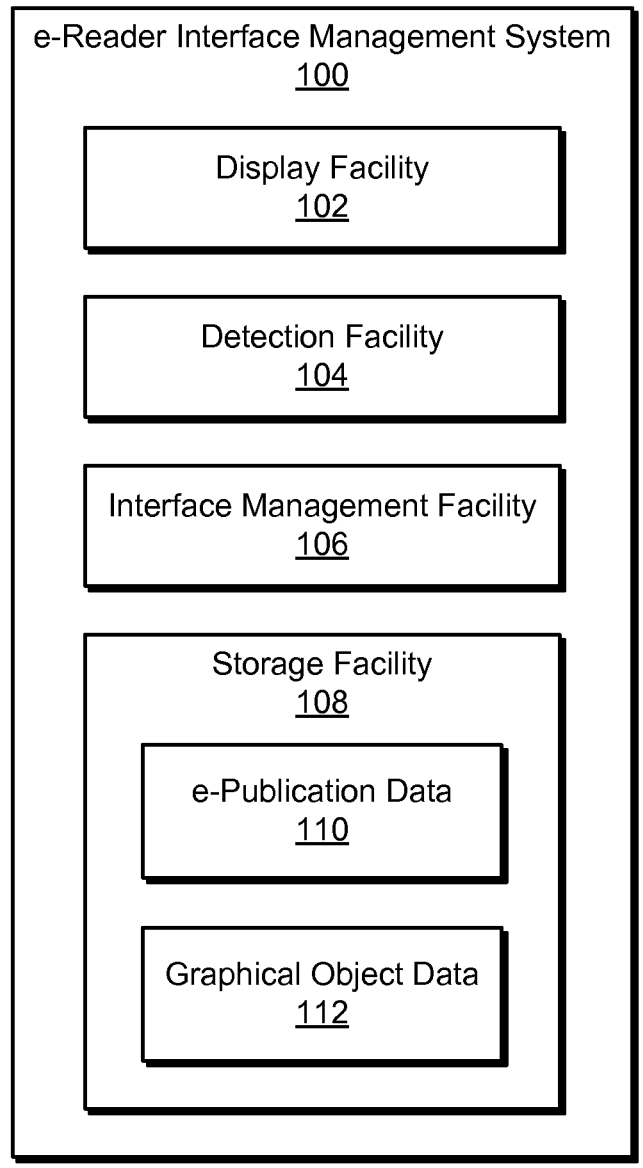
FIG. 1 illustrates an exemplary e-reader interface management system according to principles described herein.

Exemplary methods and systems for managing an e-reader interface are disclosed herein. As described in more detail below, in an exemplary method, an e-reader interface management system may direct an e-reader device to display a plurality of graphical objects representative of a plurality of segments of an e-publication, detect a user interaction with a graphical object within the plurality of graphical objects and representative of a segment within the plurality of segments, and direct the e-reader device to remove at least one other graphical object within the graphical objects from the display of the graphical objects, wherein the at least one other graphical object is representative of at least one other segment within the plurality of segments that is unrelated to the segment. In an additional or alternative exemplary method, an e-reader interface management system may direct an e-reader device to display a plurality of graphical objects representative of a plurality of segments of an e-publication, detect a user interaction with a graphical object within the plurality of graphical objects and representative of a segment within the plurality of segments, and direct the e-reader device to further display one or more additional graphical objects representative of one or more additional segments of the e-publication that are related to the segment. Additional exemplary methods and/or systems are also disclosed herein.

As will be explained in more detail below, the exemplary methods and systems disclosed herein may provide, manage, and/or control one or more e-reader interfaces. For example, the methods and systems disclosed herein may be configured to provide and manage an e-reader interface configured to facilitate the browsing, discovery, and/or access of e-publication content in an intuitive and/or appealing manner. Accordingly, the methods and systems disclosed herein may enhance a user's experience of a corresponding e-publication. Additional benefits and/or advantages will be apparent from the details disclosed herein.

As used herein, the term "e-reader interface" may refer generally to any user interface configured to allow a user to browse, discover, access, and/or experience e-publication content by way of an e-reader device. In some examples, an e-reader interface may be displayed by an e-reader device (e.g., on a display screen associated with the e-reader device).

As used herein, the terms "e-reader device" and "e-reader" may refer to any suitable computing device configured to access, read, and/or display an e-publication for experiencing (e.g., reading, viewing, etc.) by a user. In some examples, an e-reader may include a computing device (e.g., a mobile phone device, a tablet computer, a personal-digital assistant device, a handheld device, a laptop computer, a personal computer, etc.) implementing one or more software applications that allow the computing device to access, read, and/or display e-publications. In additional or alternative examples, an e-reader may be a "dedicated e-reader" (e.g., a Kindle, a Nook, etc.) that is configured to be used primarily as an e-reader device.

As used herein, the term "e-publication" may refer to any publication published in electronic/digital form. For example, an e-publication may include the electronic form of a magazine (e.g., an e-magazine), a book (e.g., an e-Book), a newspaper, any other suitable publication, and/or any portion thereof. An e-publication may include text, one or more images (e.g., photographs, illustrations, graphs, tables, etc.), and/or any other suitable e-publication content. In some examples, an e-publication may be the digital equivalent of a corresponding printed publication. An e-publication may be published in accordance with any suitable e-publication formats and/or technologies. In some examples, an e-publication may be published in accordance with a proprietary e-publication format (e.g., in accordance with one or more digital rights management technologies).

In some examples, an e-publication may include one or more segments. As used herein, the terms "segment" and "e-publication segment" may refer to any distinct portion of an e-publication. For example, an e-publication segment may include a chapter from an e-Book, an article from an e-magazine, and/or any other suitable segment of a corresponding e-publication.

As used herein, the term "graphical object" refers to one or more images (e.g., photographs, illustrations, etc.), text (e.g., one or more words, characters, numbers, symbols, etc.), one or more graphics, animation content (e.g., Flash content), and/or any other suitable graphical content that may be included (e.g., displayed) within an e-reader interface and that may be representative of an e-publication, a segment of an e-publication, a category of e-publication content, an image from an e-publication, and/or any other suitable content associated with an e-publication. In some examples, a graphical object may include a thumbnail image, a title, an author, a number (e.g., a corresponding chapter or page number), and/or any other suitable content associated with a corresponding e-publication and/or e-publication segment. In some examples, as will be explained in more detail below, the shape, organization, design, movement, and/or appearance of a group of graphical objects may graphically simulate (e.g., may be visually similar to) a wind chime wherein each graphical object in the group simulates an element of the wind chime (or simply "wind chime element).

As used herein, the term "user interaction" may refer to any suitable user interaction associated with an e-reader device, an e-reader interface, and/or an e-publication. In some examples, a user interaction may be provided by way of an input device (e.g., a touch screen, an input button, a remote control device, a keypad, a mouse device, etc.). For example, a user interaction may include a touch gesture provided by way of a touch screen associated with an e-reader device. Additionally or alternatively, each specific user interaction may be associated with a corresponding command, request, action, and/or operation. Accordingly, a user may selectively utilize one or more specific user interactions to provide one or more corresponding requests and/or initiate one or more corresponding actions.

Exemplary systems and methods will now be described in reference to the drawings.

FIG. 1 illustrates an exemplary content management system 100 (or simply "system 100"). As will be described in more detail below, system 100 may be configured to provide, manage, control, and/or govern one or more e-reader interfaces.

System 100 may include, but is not limited to, a display facility 102, a detection facility 104, an interface management facility 106 (or simply "management facility 106"), and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

As will be described in more detail below, display facility 102 may be configured to direct an e-reader to display (e.g., by way of a display screen associated with the e-reader) a plurality of graphical objects representative of a plurality of corresponding segments of an e-publication. For example, display facility 102 may be configured to direct an e-reader to display a group of graphical objects each representative of an article, an advertisement, an image, or any other suitable content or segment of an e-magazine. As will be explained in more detail below, in some examples, a user may interact with one or more of the graphical objects to access and/or experience one or more corresponding e-publications.

In some examples, as will be described below, a group of graphical objects may be visually similar to a wind chime and each individual graphical object may be visually similar to an individual wind chime element. For example, the shape, organization, movement, and/or appearance of one or more graphical objects may be configured to simulate the shape, organization, movement, and/or appearance of a wind chime, as will be explained in more detail below.

Detection facility 104 may be configured to detect one or more user interactions in any suitable manner. For example, detection facility 104 may be configured to detect a user's interaction with an e-reader, an e-reader interface, one or more graphical objects (e.g., displayed within an e-reader interface), one or more e-publications and/or segments thereof (e.g., a user's viewing and/or reading of a particular e-magazine and/or corresponding article), and/or an input device (e.g., a touch screen and/or one or more input buttons associated with an e-reader). The detected user interaction may be any suitable user interaction, such as disclosed herein.

Management facility 106 may be configured to provide, manage, govern, and/or otherwise control one or more e-reader interfaces. For example, management facility 106 may be configured to provide and/or manage an e-reader interface to be displayed by an e-reader device and configured to facilitate the discovery and/or access of e-publication content. In some examples, management facility 106 may be configured to dynamically adjust an e-reader interface in response to one or more user interactions detected by detection facility 104. To illustrate, in response to a detected user interaction, management facility 106 may be configured to direct a corresponding e-reader device to remove one or more graphical objects from the e-reader interface, display one or more additional graphical objects within the e-reader interface, reposition a graphical object within the e-reader interface, rearrange one or more graphical objects within the e-reader interface, and/or adjust the e-reader interface in any other suitable manner. In additional or alternative examples, management facility 106 may be configured to direct an e-reader device to emit one or more sounds in accordance with a detected user interaction. Management facility 106 may be additionally or alternative configured to manage an e-reader interface in any other suitable manner.

Storage facility 108 may be configured to maintain e-publication data 110 representative of one or more e-publications and/or corresponding content and information. For example, e-publication data 110 may include data representative of an e-publication itself, data representative of content associated with an e-publication, data representative of a user's interactions with an e-publication, data representative of information associated with an e-publication, and/or any other suitable data associated with an e-publication. Storage facility 108 may be further configured to maintain graphical object data 112 representative of one or more graphical objects displayed by display facility 102. Storage facility 108 may be configured to maintain additional or alternative data as may serve a particular implementation.

Figure 2:
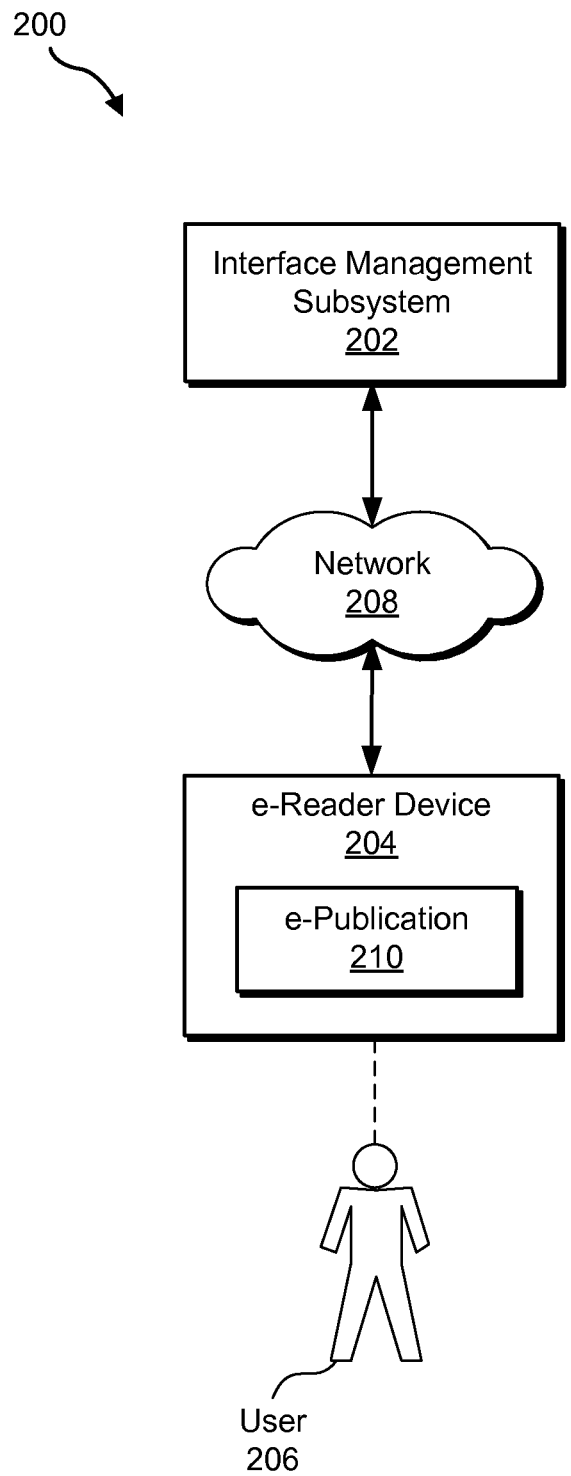
FIG. 2 illustrates an exemplary implementation of the system of FIG. 1 according to principles described herein.

FIG. 2 illustrates an exemplary implementation 200 of system 100 wherein an interface management subsystem 202 (or simply "management subsystem 202") is communicatively coupled to an e-reader device 204 associated with a user 206. As will be described in more detail below, display facility 102, detection facility 104, management facility 106, and storage facility 108 may each be implemented on one or both of management subsystem 202 and e-reader device 204.

Management subsystem 202 and e-reader device 204 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

In certain embodiments, management subsystem 202 and e-reader device 204 may communicate via a network 208, which may include one or more networks, including, but not limited to, wireless networks (Wi-Fi networks), wireless communication networks (e.g., 3G and 4G networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, local area networks, and any other networks capable of carrying data and/or communications signals between management subsystem 202 and e-reader device 204. Communications between management subsystem 202 and e-reader device 204 may be transported using any one of the above-listed networks, or any combination or sub-combination of the above-listed networks.

While FIG. 2 shows management subsystem 202 and e-reader device 204 communicatively coupled via network 208, it will be recognized that management subsystem 202 and e-reader device 204 may be configured to communicate one with another in any other suitable manner (e.g., via one or more direct connections).

As mentioned and as shown in FIG. 2, e-reader device 204 may be configured to maintain an e-publication 210 (e.g., in the form of data representative of the e-publication and/or remote access to data representative of the e-publication). Accordingly, user 206 may have access to and/or experience e-publication 210. In some examples, e-publication 210 may include a plurality of segments (e.g., chapters, articles, etc.). As will be explained in more detail below, e-reader device 204 may be configured to display an e-reader interface configured to facilitate interaction with, access to, and/or experiencing (e.g., viewing, reading, etc.) of e-publication 210 by user 206.

In certain embodiments, system 100 may be implemented entirely by or within management subsystem 202 or e-reader device 204. In other embodiments, components of system 100 may be distributed across management subsystem 202 and e-reader device 204. In some examples, e-reader device 204 may include a client (e.g., a client application) implementing one or more of the facilities of system 100.

Management subsystem 202 may be implemented by one or more computing devices. For example, management subsystem 202 may be implemented by one or more server devices. Additionally or alternatively, e-reader device 204 may be implemented by any suitable e-reader device, such as disclosed herein.

Figure 3:
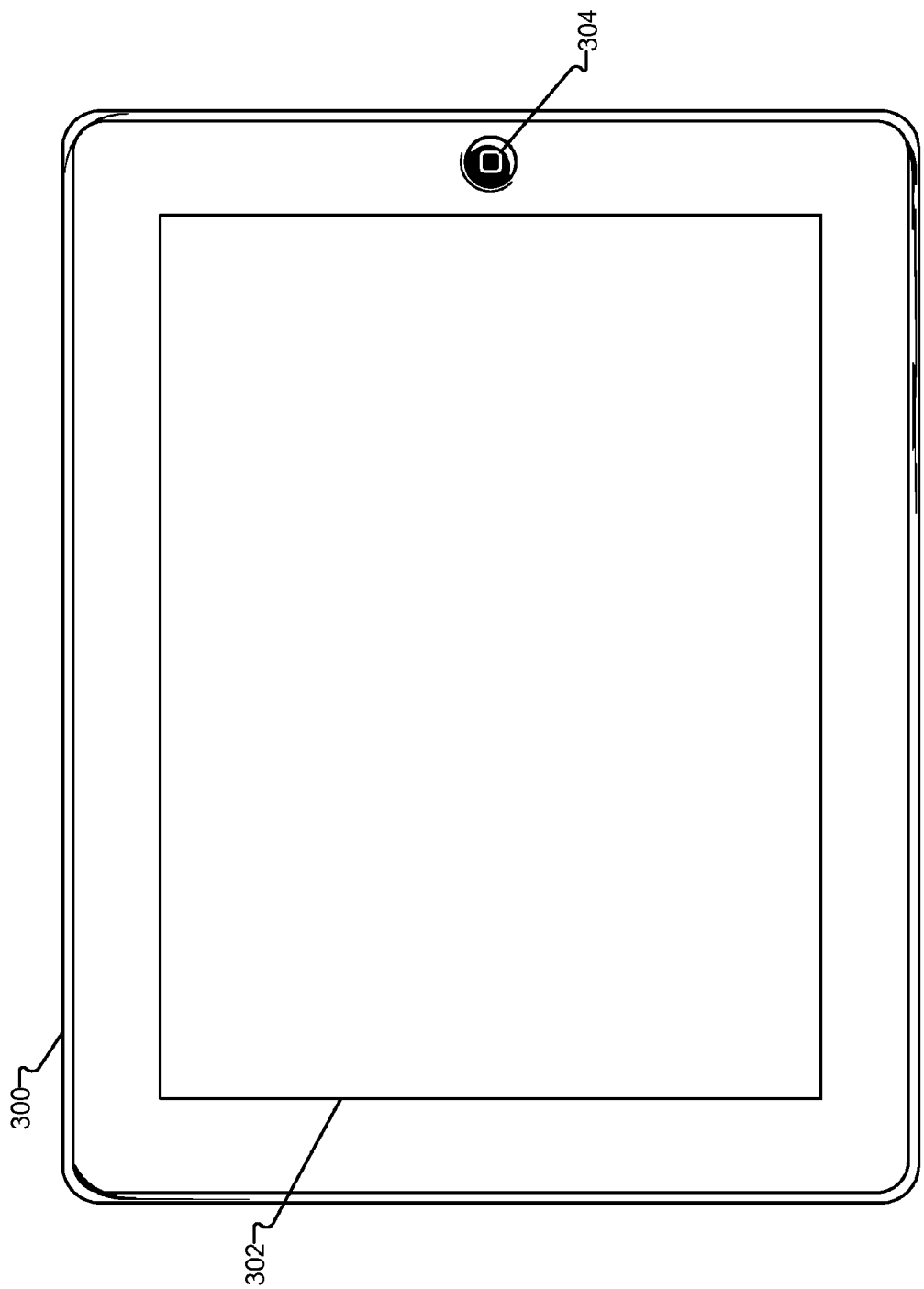
FIG. 3 illustrates an exemplary e-reader device according to principles described herein.

To illustrate, FIG. 3 shows an exemplary e-reader device 300 that may implement e-reader device 204. As shown, e-reader device 300 may include a display screen 302 and/or one or more input buttons (e.g., input button 304). In some examples, e-reader device 300 may be configured to present (e.g., display) text, images, and/or other content from an e-publication by way of display screen 302. Display screen 302 may be a touch screen by way of which a user may interact with an e-reader interface and/or e-publication displayed on display screen 302. For example, a user may utilize display screen 302 to provide one or more touch gestures associated with one or more corresponding operations. Input button 304 may be configured to allow a user to further interact with e-reader device 300, an e-reader interface, and/or an e-publication. For example, input button 304 may be configured to allow a user to operate e-reader device 300, select one or more options associated with an e-reader interface displayed on display screen 302, and/or perform any other suitable operation associated with e-reader device 300.

E-reader device 300 is provided for illustrative purposes only and is not limiting. In additional or alternative examples, the systems and methods disclosed herein may be implemented by and/or performed in accordance with any other suitable e-reader device, as may serve a particular implementation.

Figure 4:
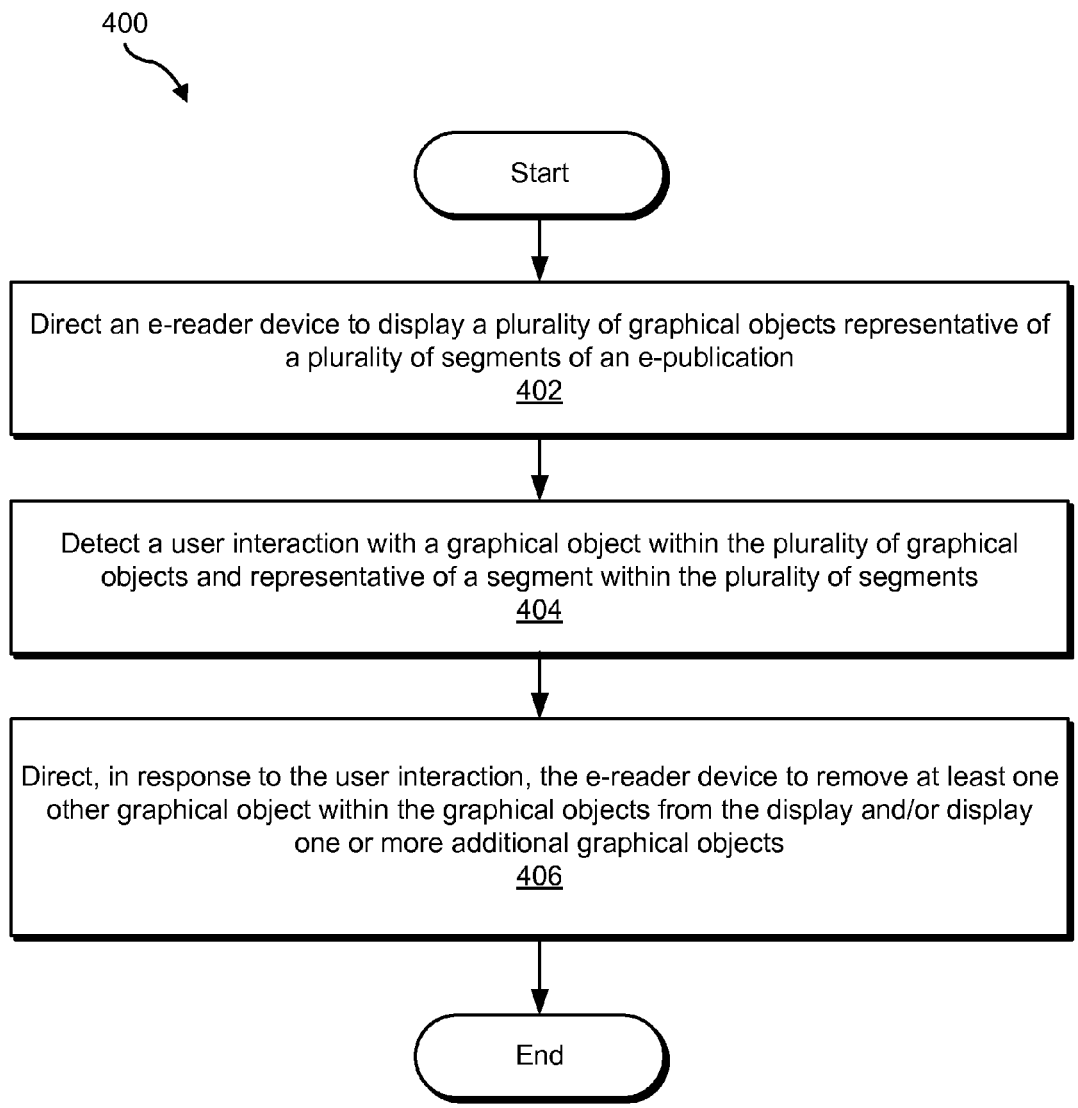
FIG. 4 illustrates an exemplary method of managing an e-reader interface according to principles described herein.

FIG. 4 illustrates an exemplary method 400 of managing an e-reader interface. While FIG. 4 illustrates exemplary steps according to one embodiment, other embodiments may omit, add to, reorder, and/or modify any of the steps shown in FIG. 4. One or more of the steps shown in FIG. 4 may be performed by any component or combination of components of system 100, interface management subsystem 202, and/or e-Reader device 204.

In step 402, an e-reader device is directed to display a plurality of graphical objects representative of a plurality of segments of an e-publication. For example, display facility 102 may be configured to direct an e-reader device (e.g., e-reader device 300) to display any suitable graphical objects representative of any suitable e-publication segments, such as disclosed herein.

In step 404, a user interaction with a graphical object within the plurality of graphical objects and representative of a segment within the plurality of segments is detected. For example, detection facility 104 may be configured to detect the user interaction with the graphical object in any suitable manner, such as disclosed herein.

In step 406, in response to the user interaction, the e-reader device is directed to remove at least one other graphical object within the graphical objects from the display and/or display one or more additional graphical objects. In some examples, the at least one other graphical object removed from the display may be representative of at least one other segment within the plurality of segments that is unrelated to the segment. Additionally or alternatively, the one or more additional graphical objects added to the display may be representative of one or more additional segments of the e-publication that are related to the segment. Management facility 106 may be configured to direct the e-reader device to remove the at least one other graphical object from the display and/or display the one or more additional graphical objects in any suitable manner, such as disclosed herein.

Figure 5:
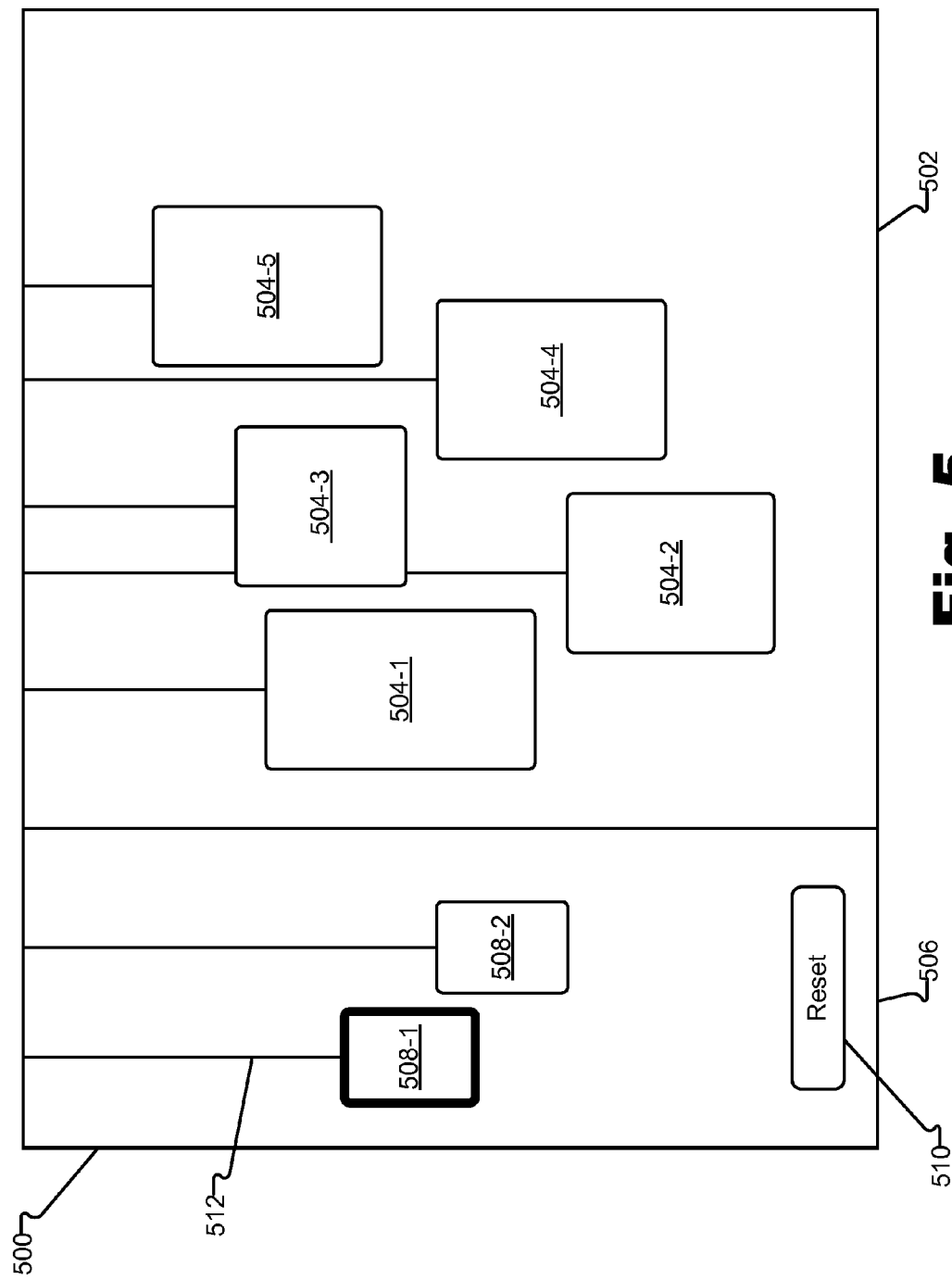
FIGS. 5-16 illustrate exemplary views of one or more exemplary e-reader interfaces according to principles described herein.

To illustrate the foregoing steps of method 400, FIGS. 5-8 illustrate various views of an exemplary e-reader interface 500 that may be displayed by way of an e-reader device (e.g., e-reader device 300). As shown in FIG. 5, interface 500 may include a first viewing pane 502 including a first group of graphical objects 504 (e.g., graphical objects 504-1 through 504-5) and a second viewing pane 506 including a second group of graphical objects 508 (e.g., graphical objects 508-1 and 508-2). As further shown in FIG. 5, interface 500 may include an option 510 configured to allow a user to "reset" interface 500 (e.g., reset interface 500 to the default view shown in FIG. 5).

In some examples, each of graphical objects 504 may be representative of a corresponding e-publication segment and each of graphical objects 508 may be representative of a particular e-publication and/or any other suitable group or category of e-publication segments. For example, each of graphical objects 508 may be representative of a corresponding e-magazine and graphical objects 504 may be representative of segments (e.g., articles, advertisements, etc.) corresponding to a selected/highlighted graphical object 508. Accordingly and to illustrate, a user may select a particular graphical object 508 (e.g., graphical object 508-1) within second viewing pane 506, after which graphical objects 504 representative of corresponding e-publication segments may be displayed within first viewing pane 502. The user may then interact with graphical objects 504 to access e-publication segments corresponding to graphical object 508-1, discover additional e-publication segments, filter out one or more e-publication segments, rearrange a sequential order of the corresponding e-publication segments, and/or perform any other suitable operation associated with the corresponding e-publication segments, as will be explained in more detail below. In additional or alternative examples, each of graphical objects 504 and 508 may include any suitable text (e.g., a title, a description, an author, a rating, etc.), images (e.g., a thumbnail image, an illustration, etc.), graphics, and/or any other suitable content associated with and/or identifying a corresponding e-publication and/or e-publication segment. It will be assumed in the examples provided herein that graphical objects 504 represent e-publication segments corresponding to graphical object 508-1. Hence, graphical object 508-1 is shown in FIG. 5 as having been selected by a user (i.e., it has a relatively thicker border than graphical object 508-2.)

As further shown in FIG. 5, graphical objects 504 and/or graphical objects 508 may be configured to visually simulate one or more wind chimes and/or corresponding wind chime elements. For example, the shapes, organization, appearance, and/or movement of graphical objects 504 and 508 may be configured to simulate the shapes, organization, appearance, and/or movement of one or more wind chimes and/or corresponding wind chime elements. In some examples, each of graphical objects 504 and 508 may hang or be suspended within interface 500 by a graphical string or cord (e.g., string 512). Although graphical objects 504 and 508 are presented in accordance with a wind chime design in FIG. 5, in additional or alternative examples, graphical objects 504 and 508 may be presented in accordance with any other suitable design or paradigm.

In some examples, a user may interact with a particular graphical object displayed within interface 500 to filter out unrelated graphical objects and/or discover additional related graphical objects. As used herein, the term "related graphical objects" may refer to two or more graphical objects that are representative of e-publication segments that share one or more common attributes. For example, two related graphical objects may be representative of two e-publication segments that are associated with a common author, a common publisher, a common photographer, a common topic, a common theme, a common genre, a common rating, and/or any other suitable common attribute or characteristic. Conversely, the term "unrelated graphical objects" may refer to two or more graphical objects that are representative of e-publication segments that do not share any common attributes or characteristics.

Figure 6:
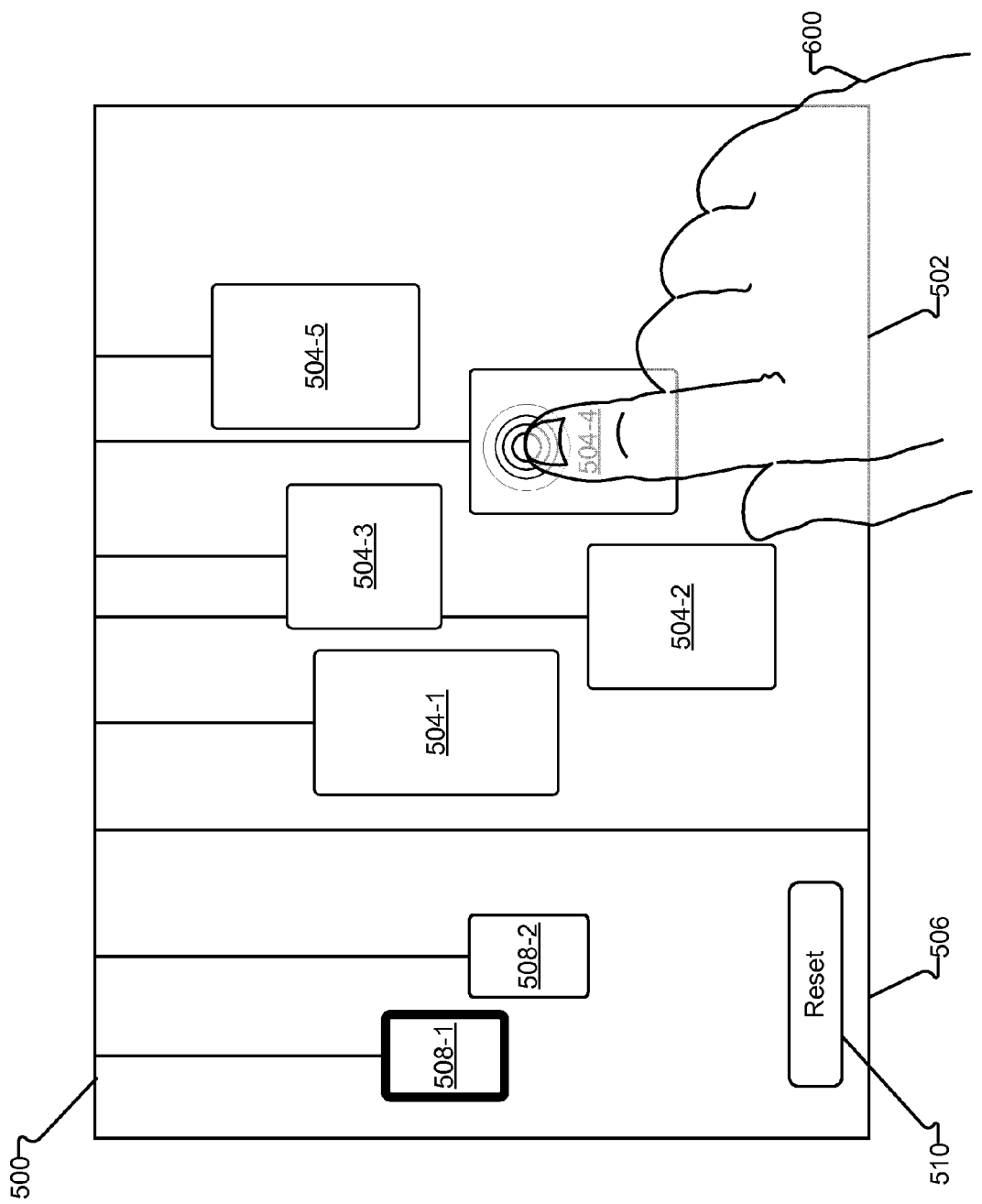

To illustrate the foregoing, FIG. 6 illustrates a user 600 interacting with graphical object 504-4 to request that graphical objects 504 unrelated to graphical object 504-4 be removed from interface 500 and/or that additional graphical objects 504 related to graphical object 504-4 be included in interface 500. Any suitable user interaction with graphical object 504-4 may be associated with this request. For example, as shown in FIG. 6, user 600 may utilize a corresponding touch screen to press and hold graphical object 504-4 to request that unrelated graphical objects be removed from interface 500 and/or that additional related graphical objects be included in interface 500.

Figure 7:
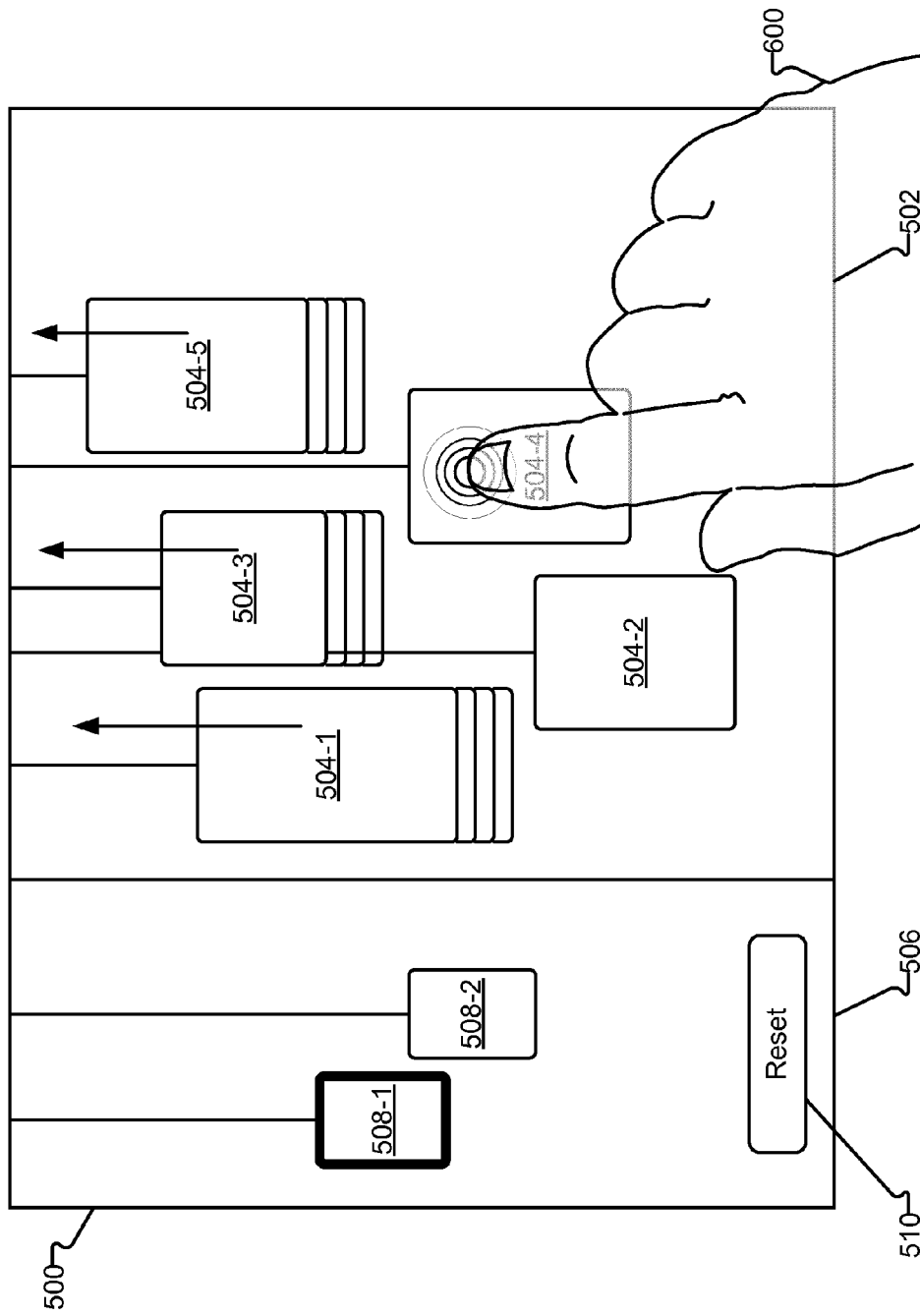

In response to the detected user interaction, management facility 106 may be configured to dynamically adjust interface 500 in accordance with the corresponding request. For example, management facility 106 may be configured to determine which of graphical objects 504 are related to graphical object 504-4 and then direct the e-reader device to remove any unrelated graphical objects from interface 500. To illustrate, graphical object 504-4 may be related to (e.g., share one or more common attributes with) graphical object 504-2, but may be unrelated to graphical objects 504-1, 504-3, and 504-5. Accordingly, as shown in FIG. 7, management facility 106 may direct the e-reader device to remove graphical objects 504-1, 504-3, and 504-5 from interface 500. For example, graphical objects 504-1, 504-3, and 504-5 may be animatedly pulled up and out of viewing pane 502, as depicted in FIG. 7.

Figure 8:
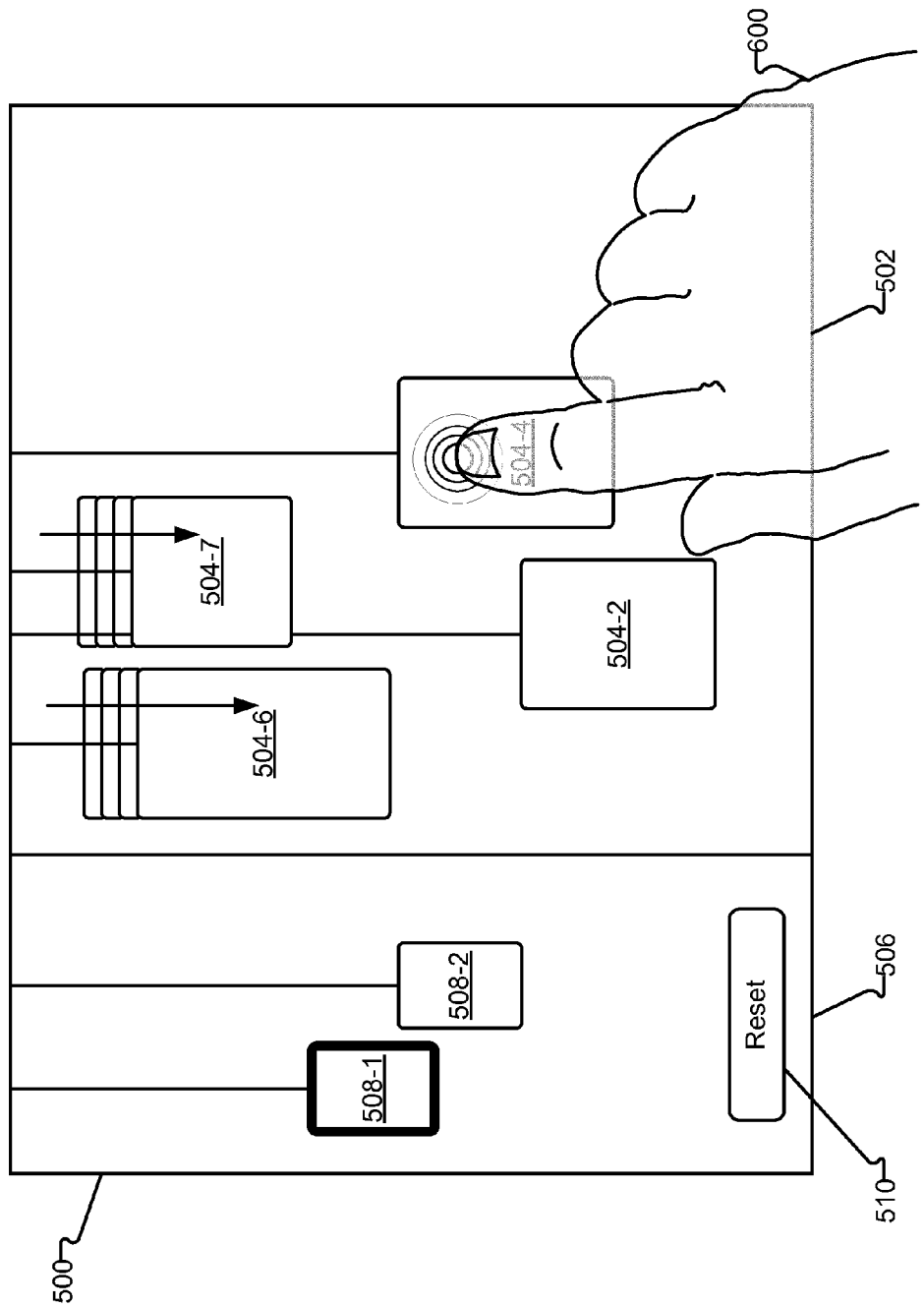

Additionally or alternatively, management facility 106 may be configured to direct the e-reader device to display one or more additional related graphical objects within interface 500. To illustrate, as shown in FIG. 8, in response to the interaction by user 600 with graphical object 504-4, management facility 106 may direct the e-reader device to display additional graphical objects 504-6 and 504-7 that are also related to graphical object 504-4. For example, additional graphical objects 504-6 and 504-7 may animatedly drop down from the top of interface 500 into viewing pane 502, as depicted in FIG. 8. Graphical objects 504-6 and 504-7 may be representative of e-publication segments from the same e-publication as graphical object 504-4 or a separate e-publication. Accordingly, user 600 may selectively utilize one or more user interactions with graphical objects 504 to focus, filter, and/or enhance the user's discovery and/or experience of an e-publication.

FIGS. 5-8 are provided for illustrative purposes only and are not limiting. In additional or alternative examples, the steps of method 400 may be implemented in any other suitable manner as may serve a particular implementation. Furthermore, system 100 may be configured to manage, adjust, and/or control an e-reader interface in any other suitable manner and/or in accordance with any other suitable user interactions.

Figure 9:
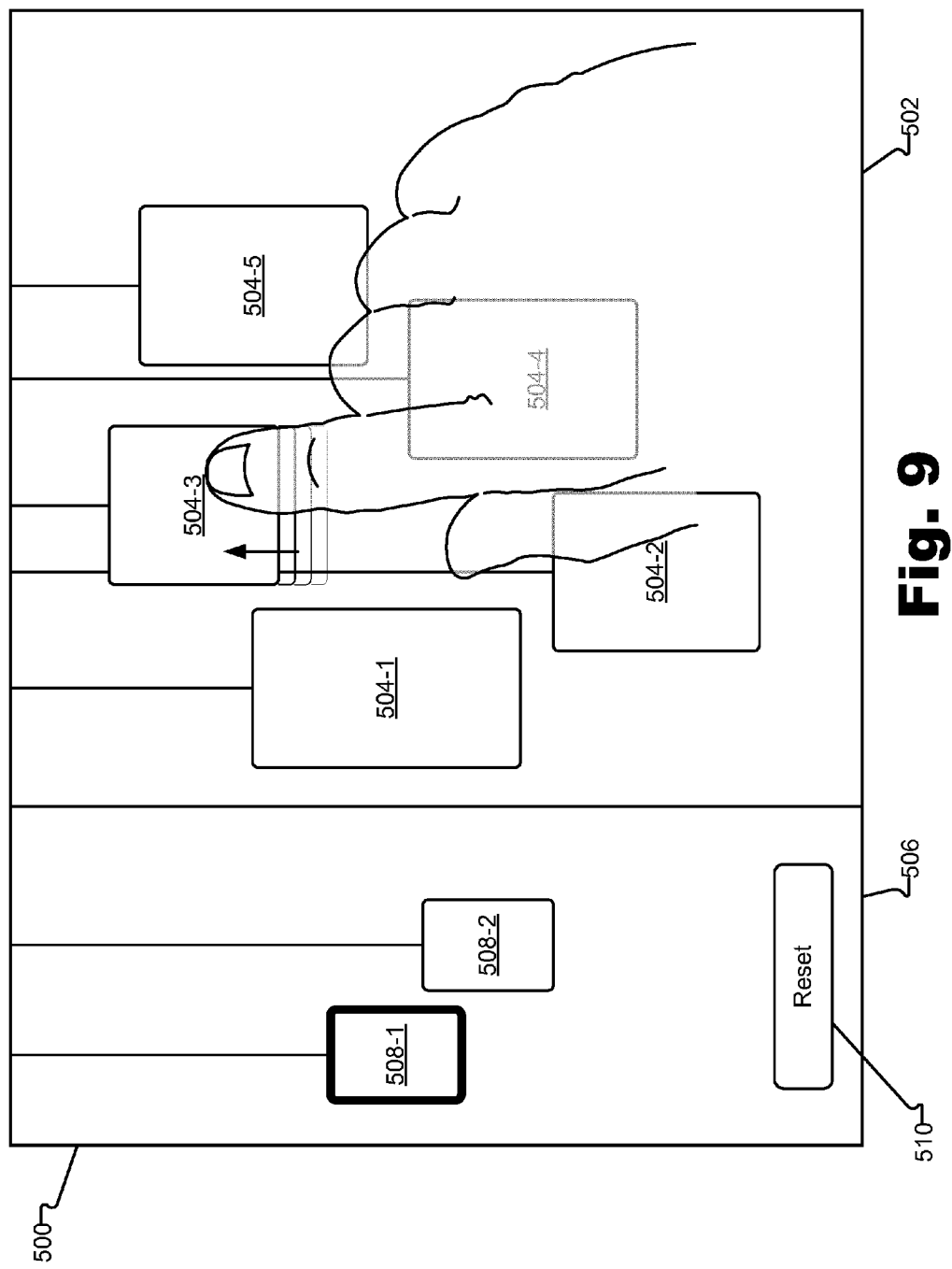

For example, interface 500 may be configured to allow a user to manually remove one or more graphical objects. To illustrate, FIG. 9, which shows a reset or default view of interface 500, illustrates another example of removing one or more graphical objects in response to a user interaction. For example, as shown in FIG. 9, user 600 may touch graphical object 504-3 and flick, swipe, drag, and/or otherwise move graphical object 504-3 out of viewing pane 502 to request that graphical object 504-3 be removed from interface 500. In response to the user interaction, management facility 106 may be configured to direct the e-reader device to remove graphical object 504-3 from interface 500.

Figure 10:
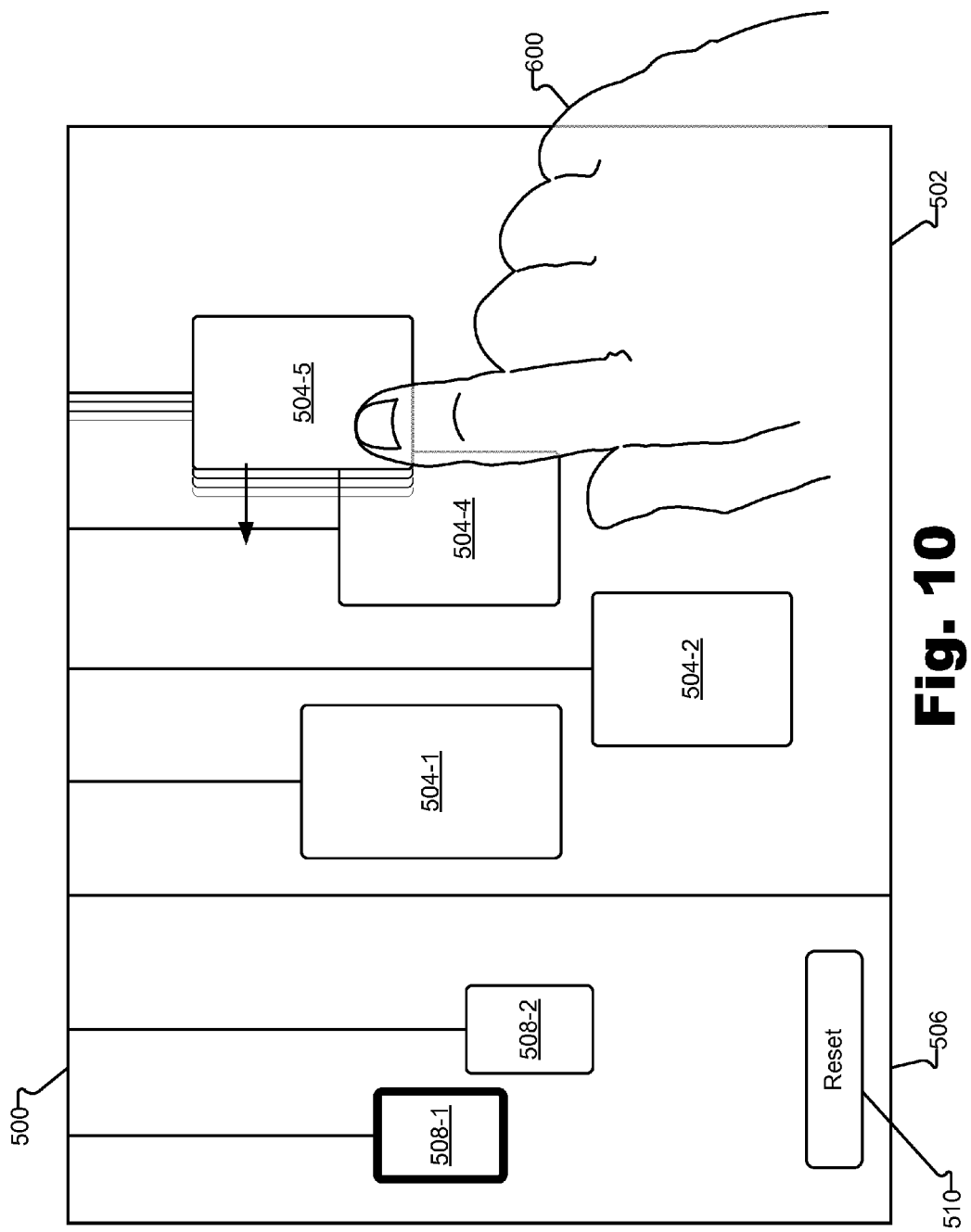

In some examples, interface 500 may be additionally or alternatively configured to allow a user to rearrange and/or reposition one or more graphical objects within interface 500. To illustrate, as shown in FIG. 10, a user may touch and drag graphical object 504-5 into the space vacated by graphical object 504-3. In response to the detected user interaction with graphical object 504-5, management facility 106 may direct the e-reader device to reposition graphical object 504-5 within interface 500 accordingly.

In some examples, management facility 106 may be additionally or alternatively configured to adjust a user's experience of an e-publication in accordance with the removal, repositioning, and/or rearrangement of one or more graphical objects within interface 500. For example, management facility 106 may be configured to remove (e.g., temporarily or permanently) one or more e-publication segments from an e-publication in response to a removal of one or more corresponding graphical objects 504 from interface 500, alter a sequential order of one or more e-publication segments within an e-publication in response to a repositioning and/or rearrangement of one or more corresponding graphical objects 504 within interface 500, and/or modify the e-publication in any other suitable manner in accordance with a user's interaction with interface 500. Accordingly, a user may utilize interface 500 and/or graphical objects 504 to selectively customize and/or personalize the user's experience of the corresponding e-publication.

Figure 11:
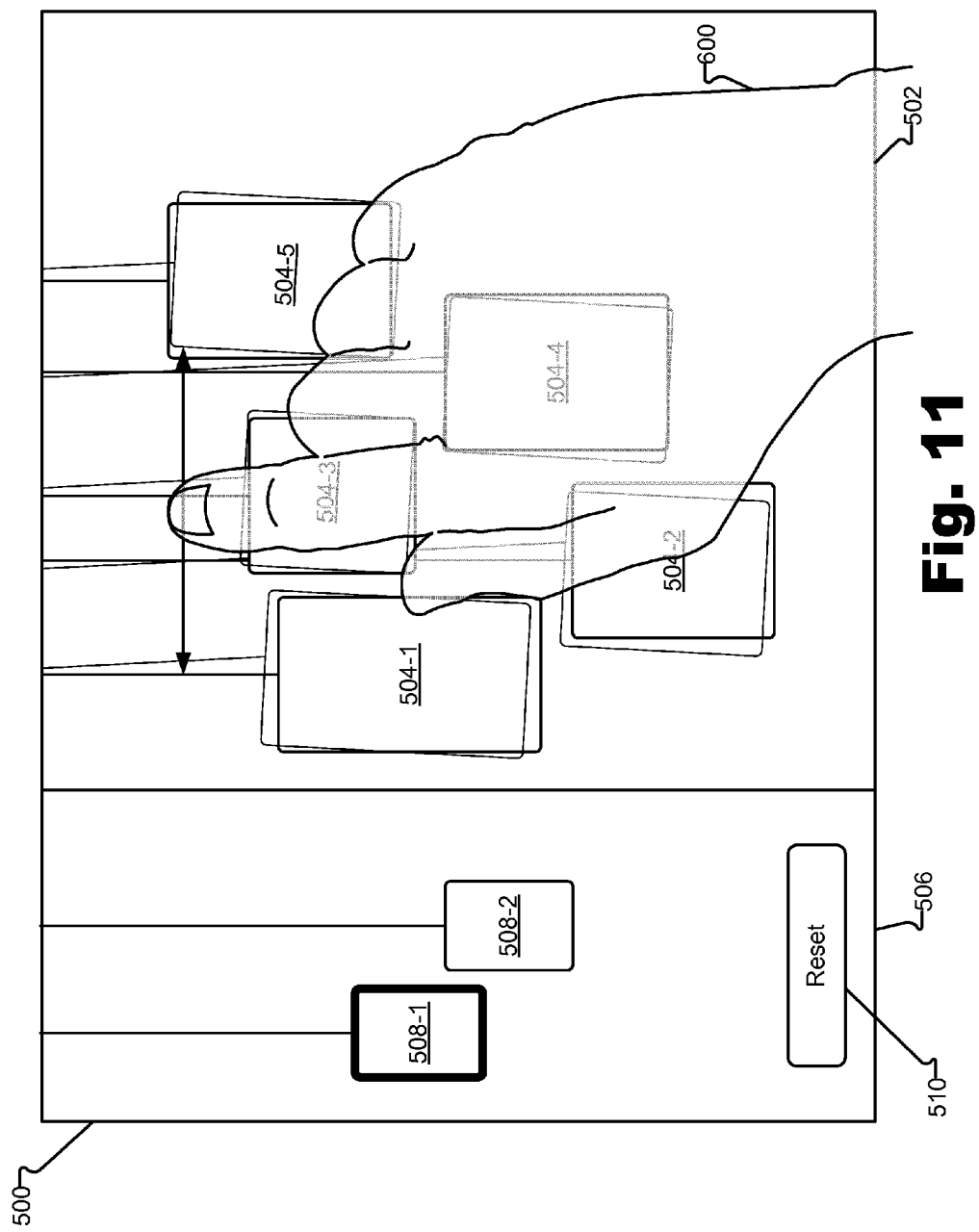

In additional or alternative examples, management facility 106 may be configured to direct an e-reader device to emit one or more sounds in response to and/or in accordance with a user interaction. To illustrate, as shown in FIG. 11, user 600 may swipe a finger across one or more strings associated with graphical objects 504. In response to the user interaction, graphical objects 504 may move (e.g., swing back and forth and/or collide with one another). In some examples, the e-reader device may concurrently emit one or more sounds representative of the movement. In some examples, the emitted sounds may simulate the sounds of a wind chime. Additionally or alternatively, a pitch, a volume, a tone, and/or any other suitable attribute of the emitted sounds may vary in accordance with the user interaction and/or the corresponding graphical objects 504. For example, the tone and volume of the sound may vary in accordance with a speed and/or duration of a corresponding user interaction, a number of graphical objects 504 interacted with, and/or any other suitable aspect associated with the user interaction and/or graphical objects 504.

Additionally or alternatively, management facility 106 may be configured to direct an e-reader device to emit one or more sounds in accordance with a user's interaction with an e-publication. To illustrate, FIG. 12 includes a view of interface 500 displaying an article of an e-publication. In some examples, the article may be displayed in response to a selection by user 600 of a graphical object corresponding to the object. For example, user 600 may tap or otherwise select any of graphical objects 504 shown in FIGS. 5-11 to access the article. The article may include one or more pages of text and/or one or more corresponding images. In some examples, in response to a user interaction with a particular portion of the article (e.g., in response to user 600 touching a particular word, sentence, paragraph, or page of the article), management facility 106 may be configured to direct the e-reader device to emit a sound associated with the particular portion of the article. In certain implementations, the emitted sound may be configured to indicate a position of the particular portion within the article. For example, the e-reader device may emit sounds having progressively higher tones as user 600 progresses through and interacts with the article from the beginning to end. Accordingly, user 600 may obtain an auditory indication of how close he/she is to finishing the article. In additional or alternative examples, management facility 106 may be configured to direct the e-reader device to emit one or more sounds for any other suitable purpose and/or in any other suitable manner.

Figure 12:
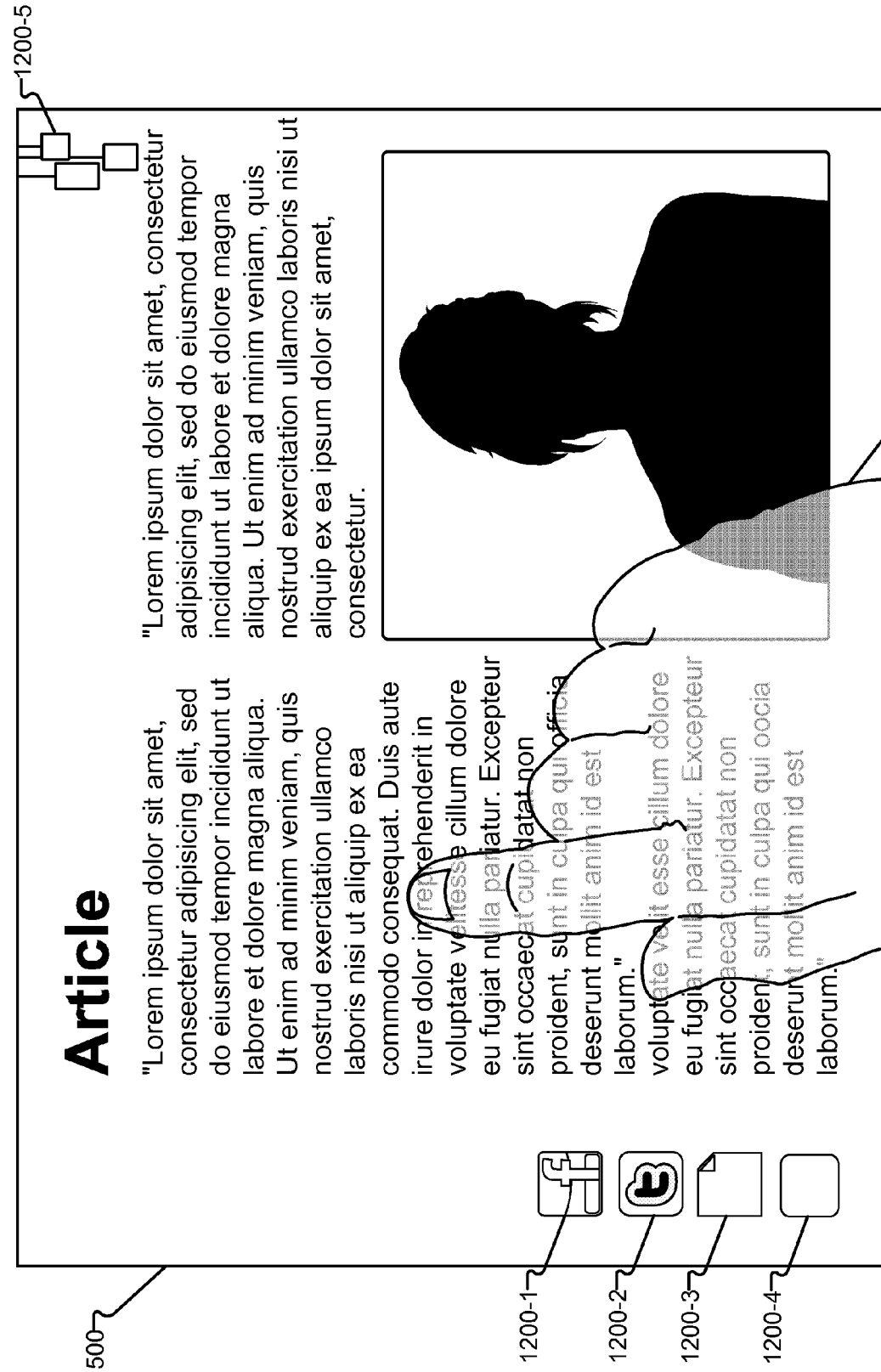

As further shown in FIG. 12, in conjunction with the display of the article, interface 500 may include one or more options 1200-1 through 1200-5 (collectively referred to herein as "options 1200"). Options 1200 may be configured to allow a user to perform any suitable operations associated with the article and/or interface 500. For example, option 1200-1 may be configured to allow a user to post e-publication content (e.g., all or a portion of the article, one or more images from the article, etc.) to a social media outlet (e.g., Facebook), option 1200-2 may be configured to allow a user to post e-publication content to another social media outlet (e.g., Twitter), option 1200-3 may be configured to allow a user to create one or more bookmarks to be associated with the article, option 1200-4 may be configured to allow a user to archive all or a portion of the article, and/or option 1200-5 may be configured to allow a user to return to a "home" view of interface 500 (e.g., the view of interface 500 shown in FIGS. 5-11).

Figure 13:
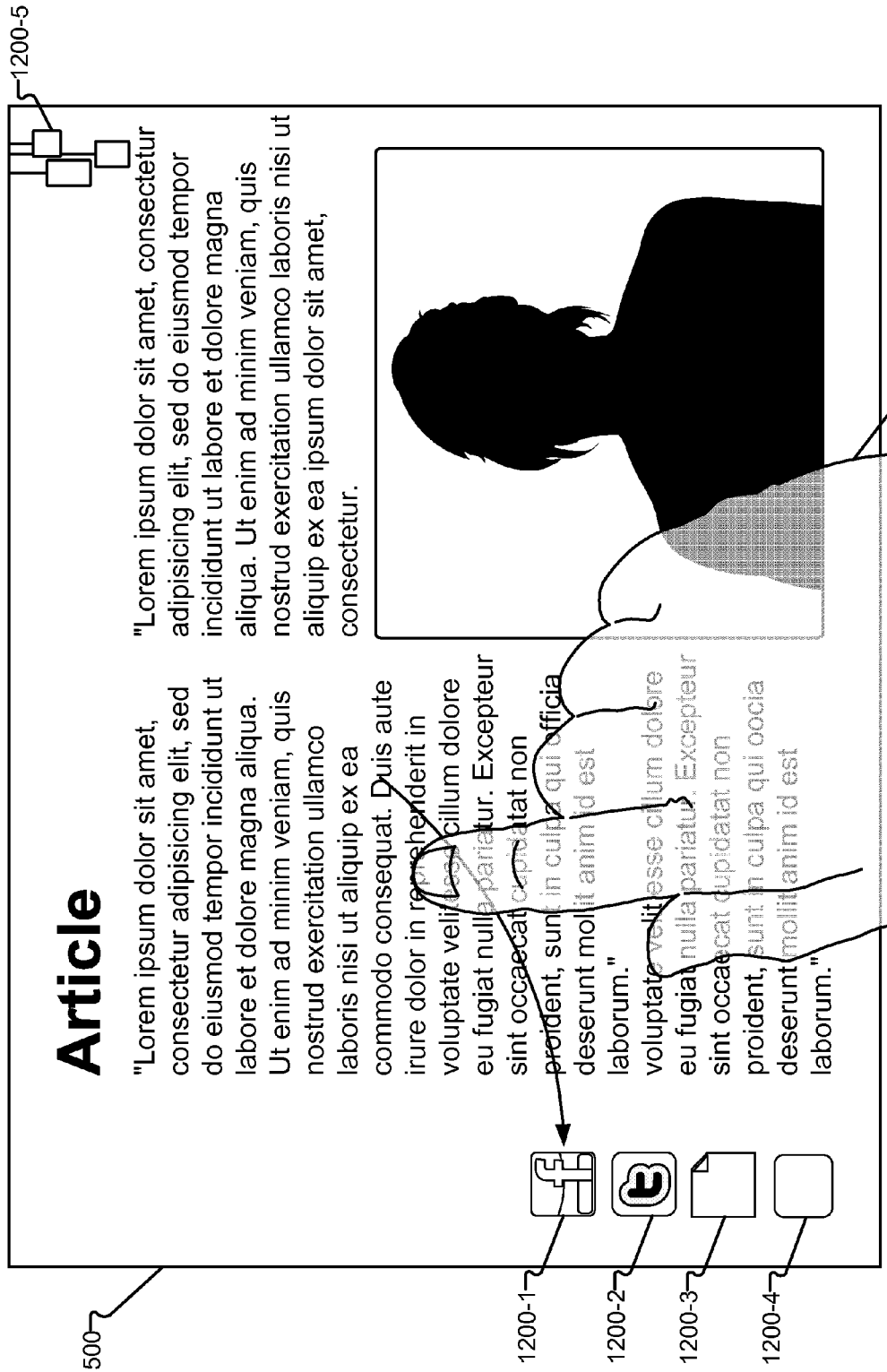

To illustrate, as shown in FIG. 13, user 600 may select and drag the article or a portion thereof (e.g., a passage from the article, an image from the article, etc.) over to option 1200-1 to post the article or portion thereof to a social media outlet. In some examples, user 600 may be prompted to enter a username and/or password associated with a corresponding social media account before the article or portion thereof is posted to the social media outlet.

Figure 14:
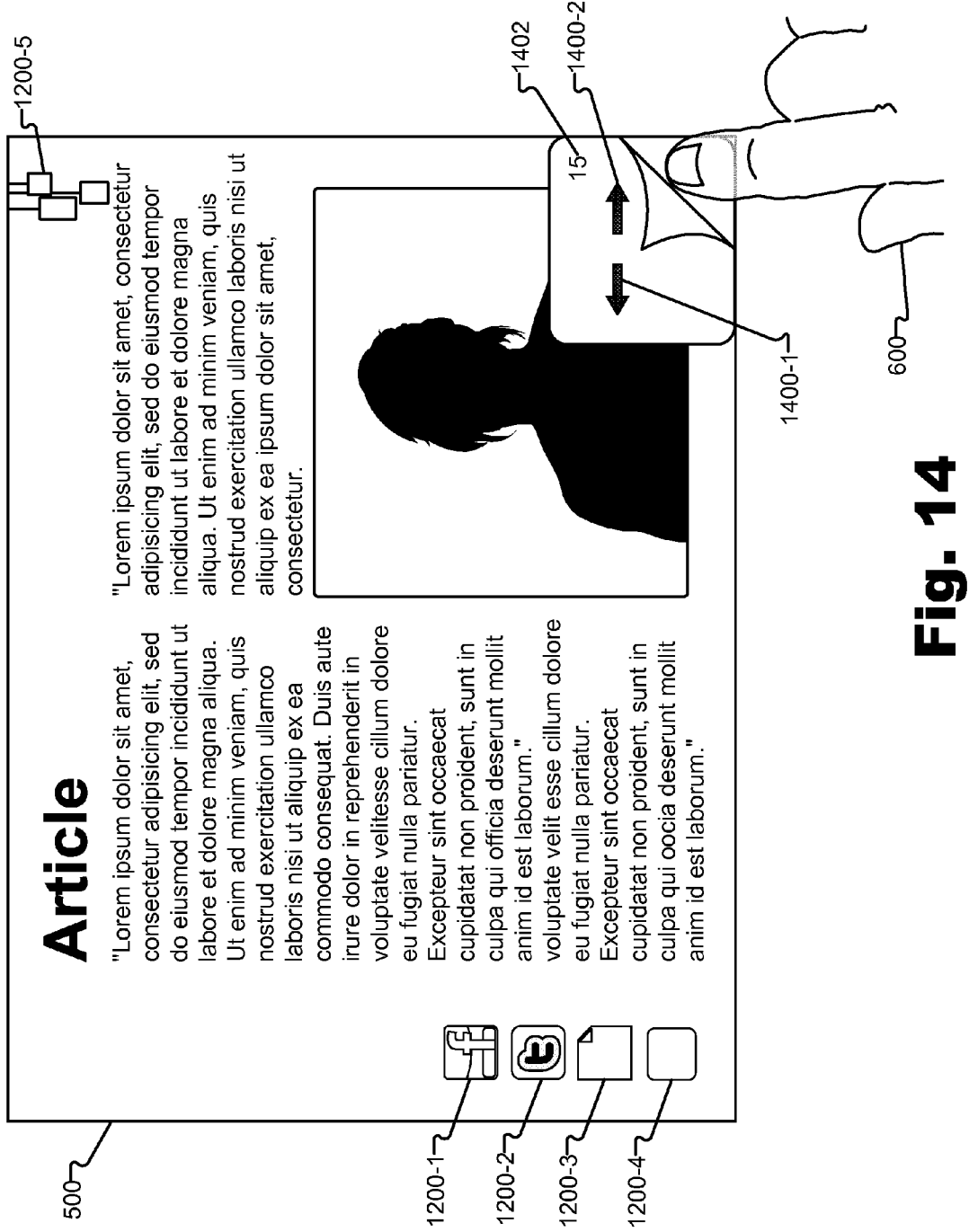

In additional or alternative examples, interface 500 may be configured to include one or more navigation options to allow a user to navigate within the article and/or a corresponding e-publication. For example, as shown in FIG. 14, in response to user 600 touching a lower corner of interface 500, interface 500 may be configured to dynamically display a first option 1400-1 configured to allow user 600 to navigate backwards within the article/e-magazine and a second option 1400-2 configured to allow user 600 to navigate forwards within the article/e-magazine (options 1400-1 and 1400-2 may be collectively referred to herein as "options 1400"). In certain implementations, user 600 may touch one of options 1400 to move forward/backward within the article/e-magazine a single page. Additionally or alternatively, user 600 may press and hold one of options 1400 to move forward/backward within the article/e-magazine multiple pages.

In certain implementations, interface 500 may display a page number 1402 configured to facilitate a user's navigation within the article/e-magazine. To illustrate, user 600 may touch and hold one of options 1400 until page number 1402 displays a desired page of the article/e-magazine, after which user 600 may release the option and the e-reader device may display the corresponding page of the article/e-magazine within interface 500. In additional or alternative examples, interface 500 may include any other suitable options configured to facilitate a user's interaction with, navigation of, and/or experience with e-publication content.

Figure 15:
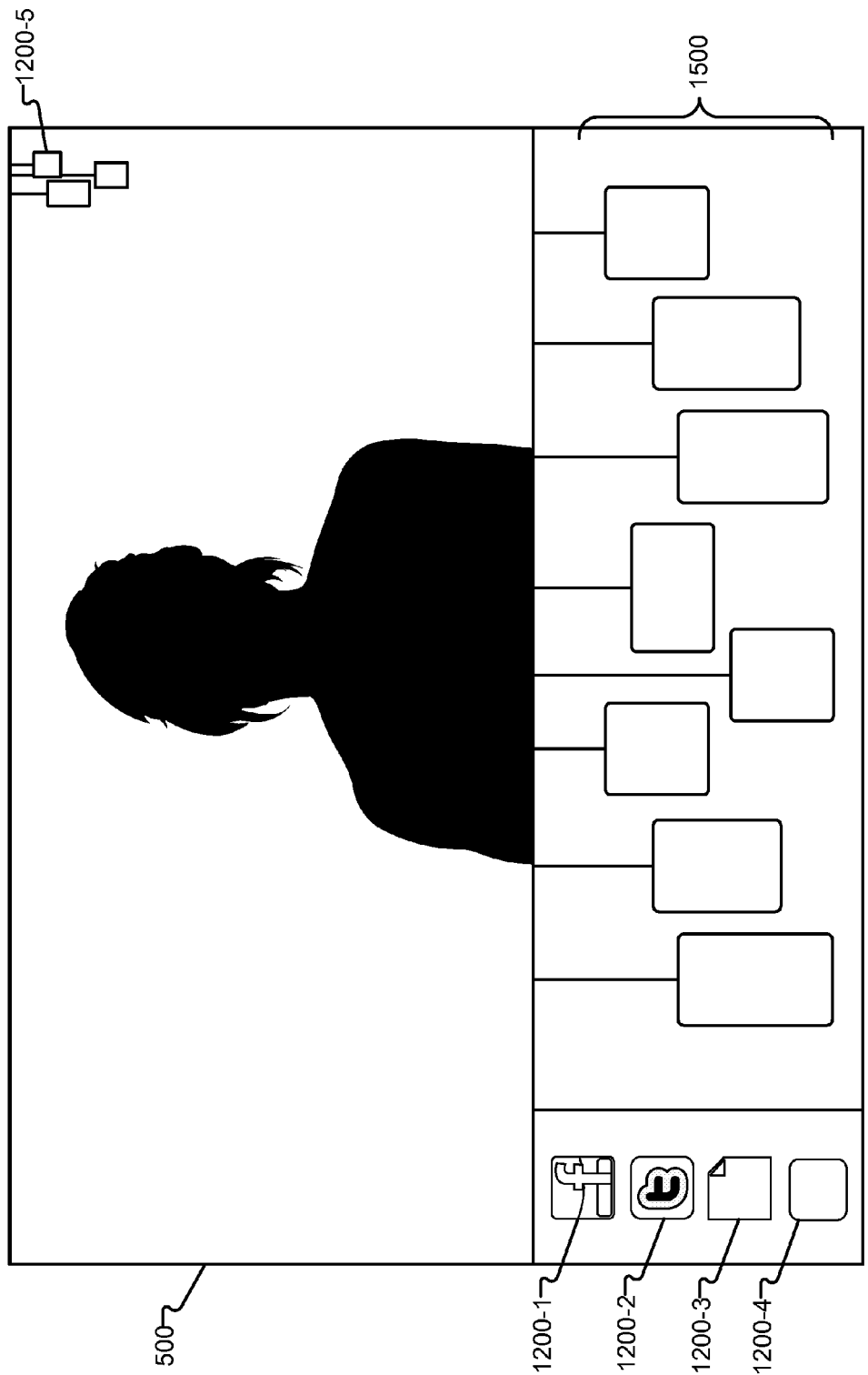

In some examples, a user may select an image displayed within interface 500 to further experience and/or interact with the selected image. To illustrate, FIG. 15 shows a view of interface 500 that may be displayed in response to a selection by user 600 of the image from the article shown in FIGS. 12-14. As shown in FIG. 15, in response to the selection of the image, an enlarged view of the image may be displayed within interface 500. Additionally or alternatively, interface 500 may include one or more graphical objects 1500 representative of additional images and/or other types of segments. In some examples, graphical objects 1500 may be representative of images that are related to (e.g., share one or more common attributes with) the displayed image. Accordingly, user 600 may utilize interface 500 and graphical objects 1500 to discover and/or experience additional images.

Figure 16:
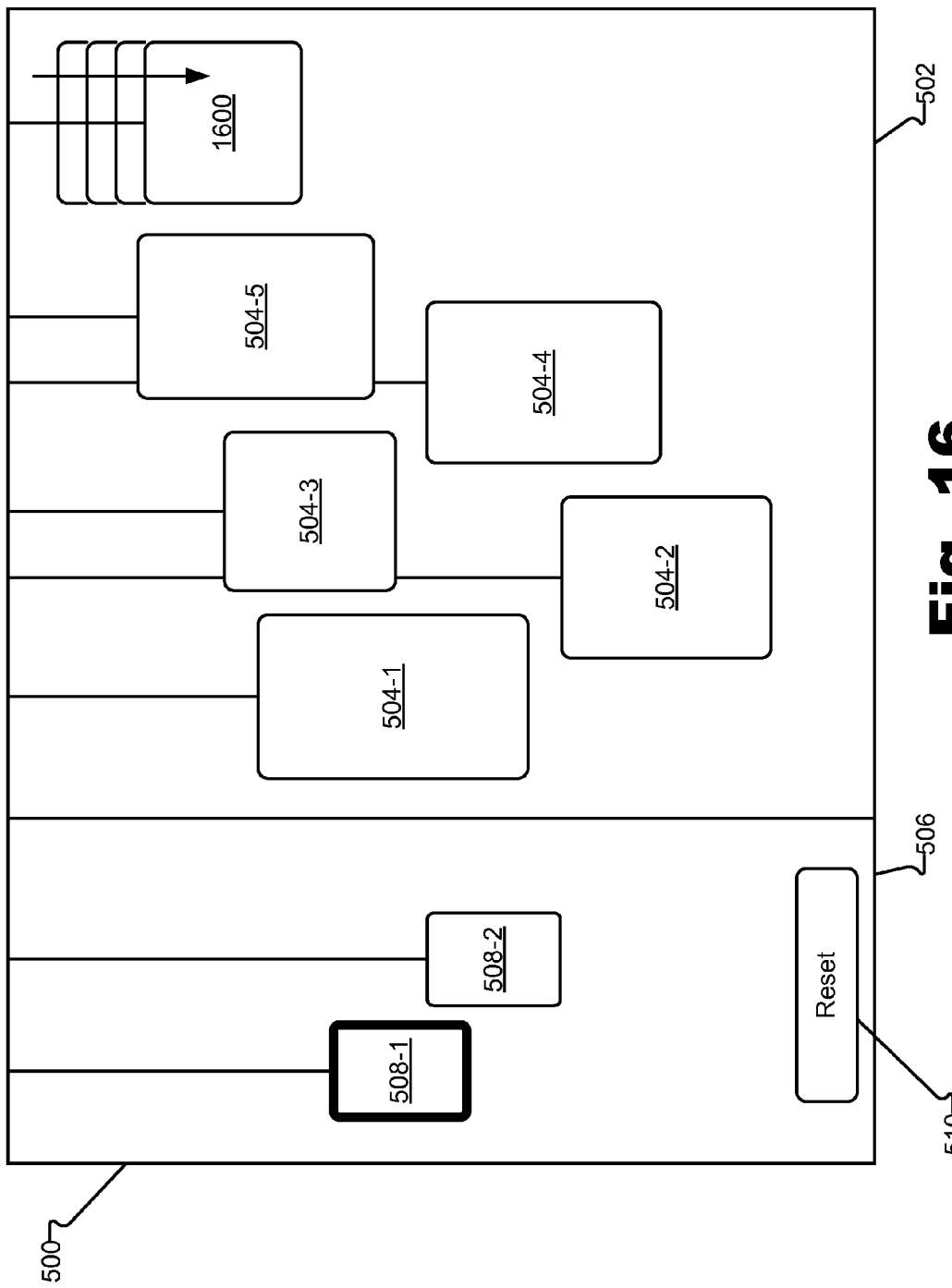

In some examples, management facility 106 may be configured to dynamically include one or more advertisements in an e-reader interface. To illustrate, FIG. 16 illustrates another view of interface 500 in which graphical objects 504 and 508 are displayed. In conjunction with graphical objects 504 and 508, management facility 106 may be configured to direct the e-reader device to insert and/or display an additional graphical object 1600 representative of and/or including an advertisement or promotional offer. In some examples, the advertisement may be related in some way to one or more e-publication segments represented by one or more of graphical objects 504. To illustrate, graphical object 504-5 may be representative of an article related to a particular foreign country and graphical object 1600 may be inserted within interface 500 near graphical object 504-5 and may be representative of an advertisement for one or more vacation deals to the particular foreign country. In additional or alternative examples, the advertisement represented by graphical object 1600 may be targeted to one or more particular users based on one or more corresponding user profiles, traits, and/or preferences. Management facility 106 may be configured to dynamically insert one or more advertisements within interface 500 in any other suitable manner.

Figure 17:
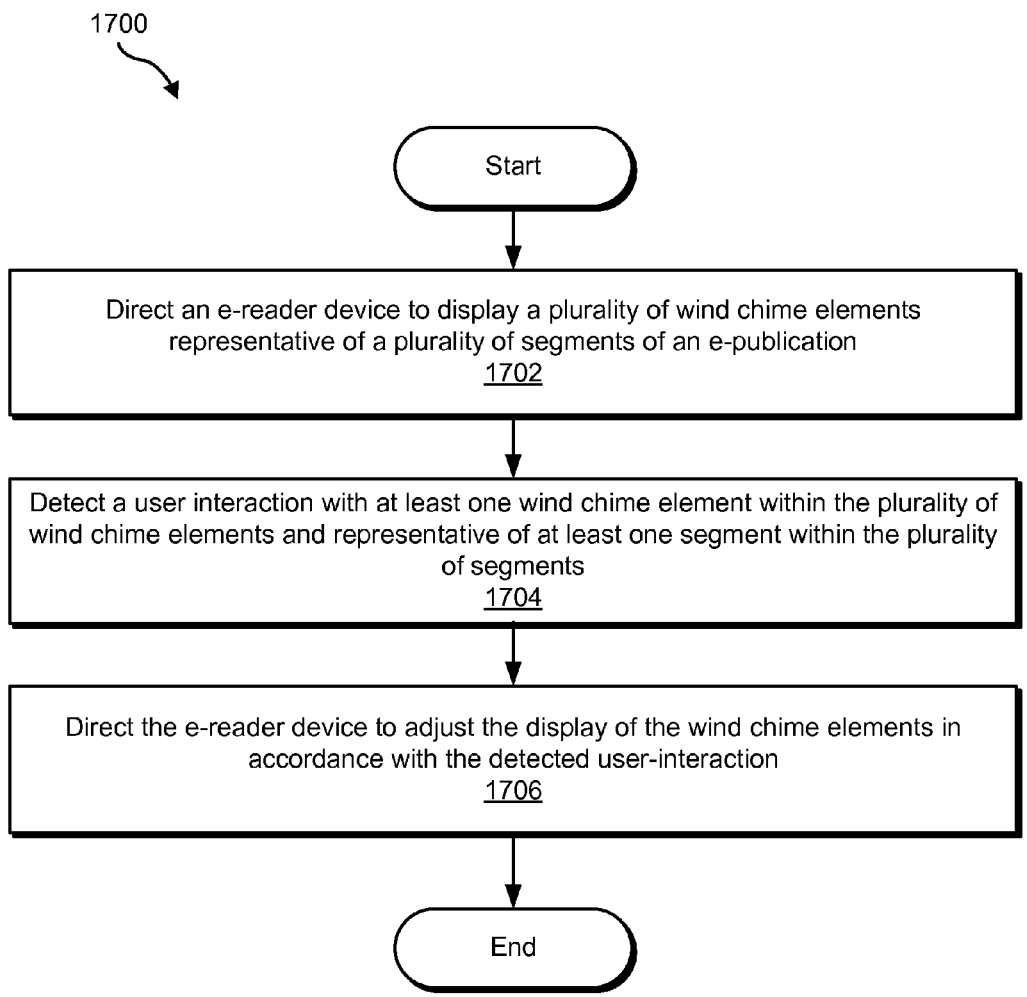
FIG. 17 illustrates another exemplary method of managing an e-reader interface according to principles described herein.

FIG. 17 illustrates another exemplary method 1700 of managing an e-reader interface. While FIG. 17 illustrates exemplary steps according to one embodiment, other embodiments may omit, add to, reorder, and/or modify any of the steps shown in FIG. 17. One or more of the steps shown in FIG. 17 may be performed by any component or combination of components of system 100, interface management subsystem 202, and/or e-Reader device 204.

In step 1702, an interface management system directs an e-reader device to display a plurality of wind chime elements representative of a plurality of segments of an e-publication. For example, display facility 102 may be configured to direct an e-reader device to display the wind chime elements in any suitable manner, such as disclosed herein.

In step 1704, the interface management system detects a user interaction with at least one wind chime element within the plurality of wind chime elements and representative of at least one segment within the plurality of segments. For example, detection facility 104 may be configured to detect the user interaction with the at least one wind chime element in any suitable manner, such as disclosed herein.

In step 1706, the interface management system directs the e-reader device to adjust the display of the wind chime elements in accordance with the detected user-interaction. For example, management facility 106 may be configured to adjust the display of the wind chime elements in any suitable manner, such as disclosed herein.

Figure 18:
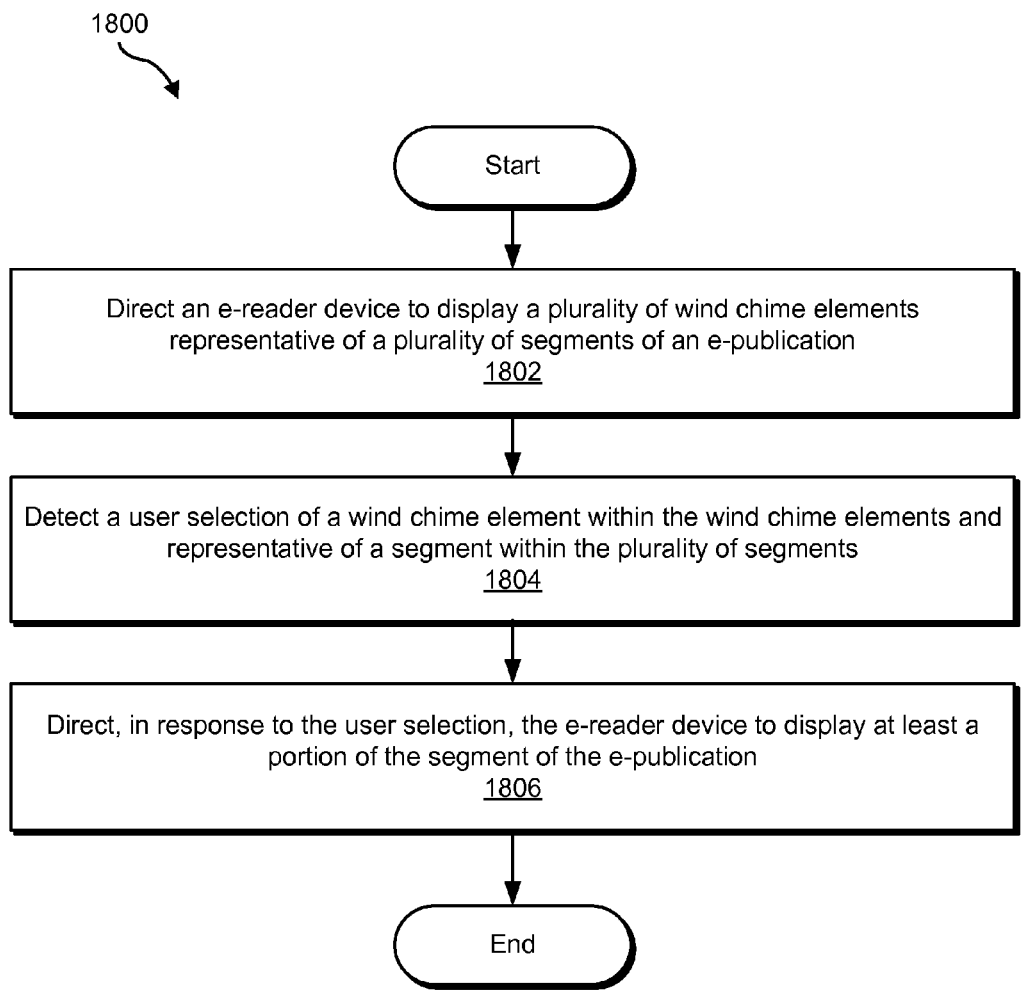
FIG. 18 illustrates another exemplary method of managing an e-reader interface according to principles described herein.

FIG. 18 illustrates another exemplary method 1800 of managing an e-reader interface. While FIG. 18 illustrates exemplary steps according to one embodiment, other embodiments may omit, add to, reorder, and/or modify any of the steps shown in FIG. 18. One or more of the steps shown in FIG. 18 may be performed by any component or combination of components of system 100.

In step 1802, an interface management system directs an e-reader device to display a plurality of wind chime elements representative of a plurality of segments of an e-publication. For example, display facility 102 may be configured to direct an e-reader device to display the wind chime elements in any suitable manner, such as disclosed herein.

In step 1804, the interface management system detects a user selection of a wind chime element within the plurality of wind chime elements and representative of a segment within the plurality of segments. For example, detection facility 104 may be configured to detect the user interaction with the wind chime element in any suitable manner, such as disclosed herein.

In step 1806, the interface management system directs the e-reader device to at least partially display the segment of the e-publication. For example, management facility 106 may be configured to direct the e-reader device to display at least a portion of the segment in any suitable manner, such as disclosed herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 19:
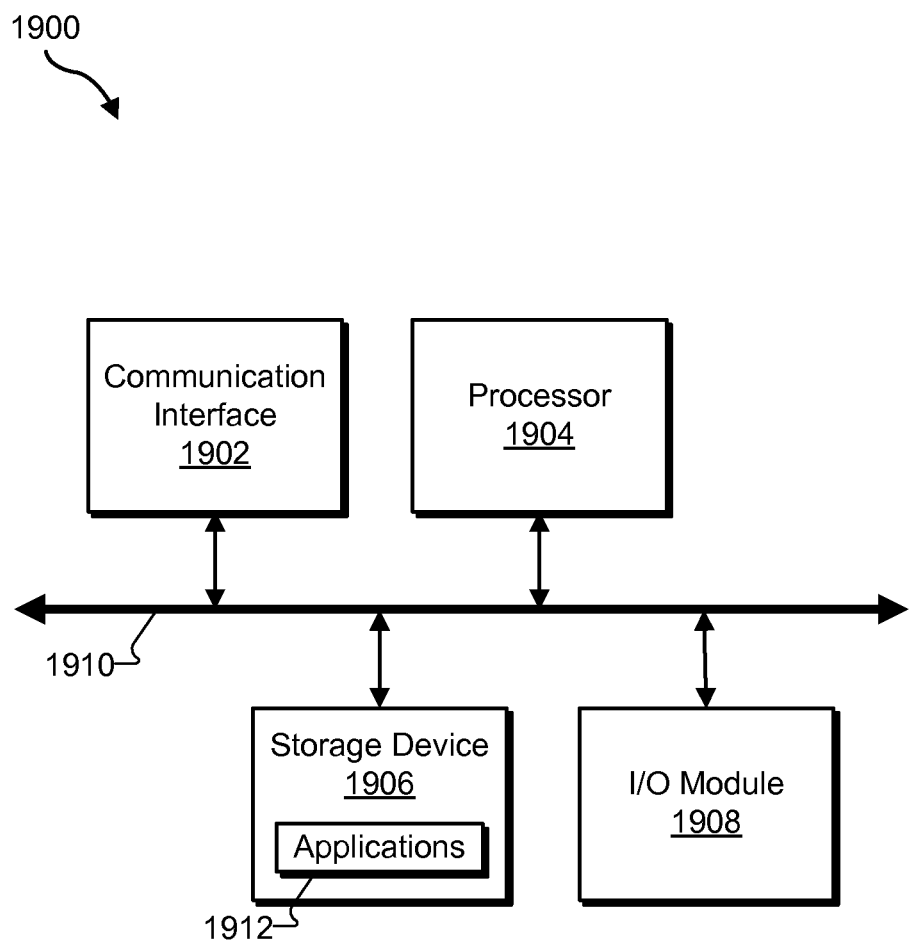
FIG. 19 illustrates an exemplary computing device according to principles described herein.

FIG. 19 illustrates an exemplary computing device 1900 that may be configured to perform one or more of the processes described herein. As shown in FIG. 19, computing device 1900 may include a communication interface 1902, a processor 1904, a storage device 1906, and an input/output ("I/O") module 1906 communicatively connected via a communication infrastructure 1910. While an exemplary computing device 1900 is shown in FIG. 19, the components illustrated in FIG. 19 are not intended to be limiting. Additional or alternative components may be used in other embodiments. Components of computing device 1900 shown in FIG. 19 will now be described in additional detail.

Communication interface 1902 may be configured to communicate with one or more computing devices. Examples of communication interface 1902 include, without limitation, a wired network interface (such as a network interface card), a wireless network interface (such as a wireless network interface card), a modem, and any other suitable interface. In at least one embodiment, communication interface 1902 may provide a direct connection between system 100 and one or more provisioning systems via a direct link to a network, such as the Internet. Communication interface 1902 may additionally or alternatively provide such a connection through, for example, a local area network (such as an Ethernet network), a personal area network, a telephone or cable network, a satellite data connection, a dedicated URL, or any other suitable connection. Communication interface 1902 may be configured to interface with any suitable communication media, protocols, and formats, including any of those mentioned above.

Processor 1904 generally represents any type or form of processing unit capable of processing data or interpreting, executing, and/or directing execution of one or more of the instructions, processes, and/or operations described herein. Processor 1904 may direct execution of operations in accordance with one or more applications 1912 or other computer-executable instructions such as may be stored in storage device 1906 or another computer-readable medium.

Storage device 1906 may include one or more data storage media, devices, or configurations and may employ any type, form, and combination of data storage media and/or device. For example, storage device 1906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1906. For example, data representative of one or more executable applications 1912 (which may include, but are not limited to, one or more of the software applications described herein) configured to direct processor 1904 to perform any of the operations described herein may be stored within storage device 1906. In some examples, data may be arranged in one or more databases residing within storage device 1906.

I/O module 1906 may be configured to receive user input and provide user output and may include any hardware, firmware, software, or combination thereof supportive of input and output capabilities. For example, I/O module 1906 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1906 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1906 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1900. For example, one or more applications 1912 residing within storage device 1906 may be configured to direct processor 1904 to perform one or more processes or functions associated with display facility 102, detection facility 104, and/or management facility 106. Likewise, storage facility 108 may be implemented by or within storage device 1906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   directing, by an e-reader interface management system, an e-reader device to display, within an interface, a plurality of graphical objects representative of a plurality of segments of an e-publication as hanging within the interface from a plurality of graphical strings;
   detecting, by the e-reader interface management system, a user interaction with a graphical object within the plurality of graphical objects and representative of a segment within the plurality of segments; and
   directing, by the e-reader interface management system in response to the user interaction, the e-reader device to remove at least one other graphical object within the graphical objects from the interface by animating a pulling of the at least one other graphical object up and out of the interface by at least one graphical string included in the plurality of graphical strings, wherein the at least one other graphical object is representative of at least one other segment within the plurality of segments that is unrelated to the segment.

2. The method of claim 1, further comprising directing, by the e-reader interface management system in response to the user interaction, the e-reader device to animate a dropping of one or more additional graphical objects representative of one or more additional segments of the e-publication that are related to the segment into the interface by one or more additional graphical strings included in the plurality of graphical strings.

3. The method of claim 2, wherein the segment and the one or more additional segments share one or more common attributes.

4. The method of claim 1, wherein the e-publication comprises an emagazine, and wherein the plurality of segments comprise one or more articles included in the emagazine.

5. The method of claim 4, wherein the plurality of segments further comprise one or more advertisements from the e-magazine.

6. The method of claim 1, further comprising directing the e-reader to emit a sound in accordance with the user interaction with the graphical object.

7. The method of claim 1, embodied as computer-executable instructions on at least one non-transitory computer-readable medium.

8. A method comprising:
   directing, by an e-reader interface management system, an e-reader device to display, within an interface, a plurality of graphical objects representative of a plurality of segments of an e-publication as hanging within the interface from a plurality of graphical strings;
   detecting, by the e-reader interface management system, a user interaction with a graphical object within the plurality of graphical objects and representative of a segment within the plurality of segments; and
   directing, by the e-reader interface management system in response to the user interaction, the e-reader device to further display one or more additional graphical objects representative of one or more additional segments of the e-publication that are related to the segment in the interface by animating a dropping of the one or more additional graphical objects into the interface by at least one graphical string included in the plurality of graphical strings.

9. The method of claim 8, further comprising directing, by the e-reader interface management system in response to the user interaction, the e-reader device to remove at least one other graphical object within the graphical objects from the display of the graphical objects by animating a pulling of the at least one other graphical object up and out of the interface by at least one graphical string included in the plurality of graphical strings, wherein the at least one other graphical object is representative of at least one other segment within the plurality of segments that is unrelated to the segment.

10. The method of claim 8, wherein the segment and the at least one or more additional segments share one or more common attributes.

11. The method of claim 8, wherein the e-publication comprises an emagazine, and wherein the plurality of segments comprises one or more articles from the emagazine.

12. The method of claim 8, embodied as computer-executable instructions on at least one non-transitory computer-readable medium.

13. A method comprising:
    directing, by an e-reader interface management system, an e-reader device to display, within an interface, a plurality of wind chime elements representative of a plurality of segments of an e-publication, the plurality of wind chime elements displayed as hanging within the interface from a plurality of graphical strings;
    detecting, by the e-reader interface management system, a user interaction with at least one wind chime element within the plurality of wind chime elements and representative of at least one segment within the plurality of segments, the user interaction comprising a touch gesture configured to request a removal of the at least one wind chime element from the display of the wind chime elements; and
    directing, by the e-reader interface management system, the e-reader device to animate an adjustment of the display of the at least one wind chime element in accordance with the detected user-interaction by animating a pulling of the at least one wind chime element up and out of the display by at least one graphical string included in the plurality of graphical strings and associated with the at least one wind chime element.

14. The method of claim 13, further comprising directing, by the e-reader interface management system, the e-reader device to emit a sound in accordance with the user interaction.

15. The method of claim 13, wherein further comprising:
    detecting, by the e-reader interface management system, an additional user interaction with at least one additional wind chime element within the plurality of wind chime elements and representative of at least one additional segment within the plurality of segments, the additional user interaction comprising a touch gesture configured to request a repositioning of the at least one additional wind chime element, and
    directing, by the e-reader interface management system, the e-reader device to animate an adjustment of the display of the at least one additional wind chime element in accordance with the additional user interaction by repositioning the at least one additional wind chime element and at least one graphical string included in the plurality of graphical strings and associated with the at least one additional wind chime element within the display of the wind chime elements.

16. The method of claim 15, further comprising rearranging, by the e-reader interface management system, a sequential order of the segments of the e-publication in accordance with the repositioning of the at least one additional wind chime element.

17. The method of claim 13, further comprising:
    detecting, by the e-reader interface management system, a user request to reset the display of the wind chime elements to a default setting; and
    directing, by the e-reader interface management system, the e-reader device to reset the display of the wind chime elements to the default setting.

18. The method of claim 13, further comprising directing, by the e-reader interface management system, the e-reader device to display at least one additional wind chime element representative of an advertisement associated with at least one of the segments of the e-publication.

19. A method comprising:
    directing, by an e-reader interface management system, an e-reader device to display, within an interface, a plurality of wind chime elements representative of a plurality of segments of an e-publication, the plurality of wind chime elements displayed as hanging within the interface from a plurality of graphical strings;
    detecting, by the e-reader interface management system, a user selection of a wind chime element within the wind chime elements and representative of a segment within the plurality of segments; and
    directing, by the e-reader interface management system in response to the user selection, the e-reader device to animate a removal of the plurality of wind chime elements from the interface by the graphical strings and display at least a portion of the segment of the epublication in the interface.

20. The method of claim 19, further comprising:
    detecting, by the e-reader interface management system, a user interaction with a particular portion of the segment; and
    directing, by the e-reader interface management system in response to the user interaction, the e-reader device to emit a sound associated with the particular portion.

21. The method of claim 20, wherein the sound is configured to indicate a position of the particular portion within the segment.

22. The method of claim 19, further comprising:
    detecting, by the e-reader interface management system, a user request to post at least a portion of the segment by way of a social media outlet; and
    posting, by the e-book reader device by way of the social media outlet, the at least a portion of the segment in response to the user request.

23. The method of claim 19, further comprising:
    detecting, by the e-reader interface management system, a user selection of an image from the segment;
    directing, by the e-reader interface management system in response to the user selection of the image, the e-reader device to display the image; and
    directing, by the e-reader interface management system, the e-reader device to display, in conjunction with the display of the image, one or more additional wind chime elements representative of one or more additional images related to the image.

24. A system comprising:
    a display facility, including a display, configured to direct an e-reader device to display a plurality of graphical objects representative of a plurality segments of an e-publication as hanging within the display from a plurality of graphical strings;

a detection facility communicatively coupled to the display facility and configured to detect a user interaction with a graphical object within the plurality of graphical objects and representative of a segment within the plurality of segments; and an e-reader interface management facility communicatively coupled to the detection facility and configured to direct the e-reader device to remove at least one other graphical object within the graphical objects from the display of the graphical objects by animating a pulling of the at least one other graphical object up and out of the display by at least one graphical string included in the plurality of graphical strings, wherein the at least one other graphical object is representative of at least one other segment within the plurality of segments and that is unrelated to the segment and display one or more additional graphical objects that are representative of one or more additional e-publication segments that are related to the segment in the display by animating a dropping of the one or more additional graphical objects into the display by one or more additional graphical strings included in the plurality of graphical strings.

25. The method of claim 13, wherein, in response to user interaction with the graphical string, the plurality of wind chime elements collide with one another in the interface, and wherein the method further comprises emitting, by the e-reader interface management system in response to the plurality of wind chime elements colliding with one another in the interface, one or more sounds representative of the collision.

* * * * *